US012789849B2

(12) United States Patent
Melnichenko et al.

(10) Patent No.: US 12,789,849 B2
(45) Date of Patent: Nov. 10, 2026

(54) METHODS AND PROCESSORS FOR CONTROLLING OPERATION OF A SELF-DRIVING CAR

(71) Applicant: Y.E. Hub Armenia LLC, Yerevan (AM)

(72) Inventors: Daniil Melnichenko, Minsk (BY); Aleksandr Usikov, Minsk (BY)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 19/251,352

(22) Filed: Jun. 26, 2025

(65) Prior Publication Data

US 2026/0015013 A1 Jan. 15, 2026

(30) Foreign Application Priority Data

Jul. 10, 2024 (RU) ................................ 2024119358

(51) Int. Cl.
*B60W 60/00* (2020.01)

(52) U.S. Cl.
CPC ... *B60W 60/0015* (2020.02); *B60W 2554/402* (2020.02)

(58) Field of Classification Search
CPC ....... B60W 60/0015; B60W 2554/402; B60W 60/0027
See application file for complete search history.

(56) References Cited

U.S. PATENT DOCUMENTS 11,222,459 B2 1/2022 Caulfield et al.
2019/0050653 A1* 2/2019 Natroshvili ........ G01N 15/0205
2021/0279055 A1 9/2021 Saxena et al.

FOREIGN PATENT DOCUMENTS

EP 3289578 B1 3/2019

* cited by examiner

*Primary Examiner* — Ian Jen
(74) *Attorney, Agent, or Firm* — BCF LLP

(57) ABSTRACT

Methods and electronic devices for controlling operation of a Self-Driving Car (SDC) are disclosed. The method includes acquiring object data from the sensor(s) indicative of a plurality of objects in surroundings of the SDC, generating a grid structure having a plurality of cells, generating a bitmask for the given cell indicative of ID(s) of object(s) present in a first portion of the surroundings which is covered by at least the given cell, acquiring a request indicative of a target cell in the grid structure, the target cell covering a target portion of the surroundings, identifying ID(s) of target object(s) from the plurality of objects using the bitmask of the given cell, where the target object(s) are present in the target portion of the surroundings, and controlling operation of the SDC using the control system(s) while taking into account presence of the target object(s) in the target portion of the surroundings.

20 Claims, 13 Drawing Sheets

METHODS AND PROCESSORS FOR CONTROLLING OPERATION OF A SELF-DRIVING CAR

CROSS-REFERENCE

The present application claims priority to Russian Patent Application No. 2024119358, entitled "METHODS AND PROCESSORS FOR CONTROLLING OPERATION OF A SELF-DRIVING CAR", filed Jul. 10, 2024, the entirety of which is incorporated herein by reference.

TECHNICAL FIELD

The present technology relates generally to autonomous driving, and more particularly, to methods and processors for controlling operation of a Self-Driving Car (SDC).

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Autonomous driving technology refers to the capability of a vehicle to operate and navigate without (and/or with limited) human intervention. It combines various technologies, including inter alia artificial intelligence, sensors, computer vision, and machine learning, to enable vehicles to perceive their surroundings, make decisions, and control their movements.

Generally, autonomous vehicles are equipped with an array of sensors, such as cameras, LiDAR (Light Detection and Ranging), radar, and Ground Positioning System (GPS), to gather real-time information about the environment. These sensors provide a stream of data, allowing a vehicle's computer system to interpret the information and create a detailed understanding of the surroundings.

The computer system is known to use machine learning models and other algorithms to analyze sensor data and make decisions based on predefined rules and patterns. For example, the computer system may detect objects, recognize road signs and markings, and assess traffic conditions to navigate safely and efficiently. The computer system also takes into account factors like speed limits, traffic laws, and road conditions to determine appropriate actions, such as accelerating, braking, and changing lanes.

Autonomous driving technology can operate on different levels of autonomy, ranging from level 0 (no automation) to level 5 (full automation), with each level representing different degrees of human involvement and vehicle control. Whether in the context of full automation or in the context of only partial automation, there are still several technical challenges that need to be addressed for increasing reliability, safety and efficiency of autonomous transportation.

EP 3,289,578 discloses a method for the calculation of an assignment representation of adjacent cells to a cell of an environment map.

SUMMARY

Developers of the present technology have realized at least some drawbacks with known solutions for planning movement of a SDC in its environment.

It should be noted that a computer system is configured to estimate distances between the SDC and objects in its surroundings such as pedestrians, cyclists, other vehicles, for example, in order to plan motion of the SDC in its surroundings in a safe manner. In one example, the computer system may be configured to determine distances between a current location of the SDC and current locations of objects in the surroundings. In another example, the computer system may be configured to determine distances between potential future location(s) of the SDC and potential future location(s) of objects in the surroundings.

Developers of the present technology have realized that estimation of current and/or potential future distance(s) between the SDC and the objects in its surroundings is a complex and computationally expensive process. It should be noted that distance estimation with a degree of accuracy needed for autonomous driving solutions may require execution of computationally expensive algorithms. In some implementations, the degree of accuracy for autonomous driving solutions is about 5 cm.

In some embodiments, methods and systems disclosed herein may make use of a spatial index for distance estimation. Broadly speaking, a spatial index is a data structure that enables efficient querying and retrieval of spatial data, such as points, lines, and polygons in a multidimensional space. It is commonly used in geographic information systems (GIS), databases, and other applications that deal with spatial information. The main purpose of a spatial index is to improve the performance of spatial queries by organizing and storing spatial data in a way that allows for quicker search and retrieval. This may be achieved by dividing the space into smaller regions, enabling the system to quickly narrow down the search area when looking for objects that intersect or are nearby a specific point, line, or region.

In other embodiments, methods and systems disclosed herein may make use of occupancy grids and/or distance transforms for distance estimation. Broadly, occupancy grids map the environment into a grid where each cell indicates the likelihood of an obstacle, thereby processing sensor data from tools like LiDARs and cameras, for example, into a manageable format for navigation. The occupancy grid may assist in path planning by delineating free and occupied spaces. Distance transforms may be used by calculating the minimum distance from each free cell to the nearest obstacle, aiding in collision avoidance and path optimization, for example. This combination allows autonomous vehicles to dynamically adjust paths and speeds based on real-time data about nearby obstacles, enhancing safety and efficiency in navigation.

Developers have realized the computational benefit resulting from the computer system being able to identify a reduced set of objects amongst the objects in the surroundings of the SDC for distance estimation purposes. The computer system may be configured to execute one or more distance estimation algorithms on a reduced number of objects in the surroundings, as opposed to all objects in the surroundings, thereby reducing the overall computational cost associated with the one or more distance estimation algorithms.

It should be noted that the reduced set of objects may be referred to herein as one or more "target objects" located in a "target portion" of the surroundings of the SDC. In some embodiments, the target portion of the surroundings may correspond to a portion of the surroundings for which a query has been issued by a planning module of the computer system.

In some embodiments, the planning module may be configured to perform path planning for the SDC. In these embodiments, the planning module may generate a high-level route from the SDCs current location to the destination, considering factors like road network, traffic, and user preferences. In these embodiments, the planning module may receive a global route as input and generate a detailed trajectory, considering the surroundings of the SDC (including objects/obstacles), and vehicle dynamics. In these embodiments, the planning module may perform lane changing planning by determining when and how to safely change lanes, considering factors such as traffic conditions, objects/obstacles, vehicle speed, and signaling.

In other embodiments, the planning module may be configured to perform behavior planning for the SDC. In these other embodiments, the planning module may analyze the current traffic situation, and traffic rules to perform real-time decisions, such as stopping at a red light, yielding to pedestrians, or merging into traffic. In these other embodiments, the planning module may be configured to plan one or more maneuvers such as overtaking, parking, or negotiating intersections by considering the vehicle's capabilities and the surroundings (including objects/obstacles).

In further embodiments, the planning module may be configured to perform motion planning for the SDC. In these further embodiments, the planning module may be configured to detect and avoid potential collisions with objects in the surroundings by computing safe and efficient trajectories. In these further embodiments, the planning module may be configured to plan paths that circumvent static or dynamic objects in the surroundings while considering the vehicle's kinematic and dynamic constraints. In these further embodiments, the planning module may be configured to optimize the vehicle's trajectory over a specific time horizon to minimize energy consumption, discomfort to passengers, and/or other predefined criteria.

In summary, it should be understood that the planning module may issue a large number of queries for target portions of the surroundings during a given planning cycle in order to make decisions, in real-time, based on estimated distances between target objects and the SDC for inter alia generating trajectories and/or for generating control actions for the SDC.

In one example, the query issued by the planning module may be indicative of a current vicinity of the SDC. In this example, the computer system is configured to identify target objects (amongst all the objects in the surroundings) that are within a current vicinity of a current location of the SDC provided by a localization module. The computer system may then execute the one or more distance estimation algorithms on these target objects.

In another example, the query issued by the planning module may be indicative of a current vicinity of the SDC and of a specific type of objects (e.g., pedestrians). In this other example, the computer system is configured to identify target objects (amongst all the objects in the surroundings) that (i) are within the current vicinity of the current location of the SDC provided by the localization module and (ii) are of the specific object type. The computer system may then execute the one or more distance estimation algorithms on these target objects.

In a further example, the planning module may issue a plurality of queries during a given processing cycle for ascertaining which portions of the surroundings are occupied by objects, and/or which portions of the surroundings are not occupied by objects. In this further example, the planning module may be configured to determine which portions of the surroundings can be traveled without restriction.

In at least one aspect of the present technology, there is provided methods and processors for encoding data about objects in a grid structure that is then used for providing results to queries issued by the planning module. A given cell of the grid structure covers a corresponding portion of the surroundings and contains encoded object data. The grid structure with the encoded object data may be stored in cache and employed by the computer system for performing efficient identification of target objects for respective queries issued by the planning module.

In some embodiments, encoded object data may be in a form of a bitcode, or otherwise referred herein as "bitmask". Broadly speaking, a bitmask refers to a binary pattern used for bitwise operations. It is typically represented as a sequence of bits, where each bit corresponds to a specific flag or attribute as established by a bitmask logic.

In the context of the present technology, a given bit position in a bitmask is associated with a specific object ID. For example, a given bitmask logic may dictate which object ID is to be assigned to which specific bit position within the binary representation. In one implementation, the bitmask logic may dictate that object ID "0" is to be assigned to a first bit position within the bitmask, object ID "1" is to be assigned to a second bit position within the bitmask, and so forth.

It should be noted that different bitmask logics may be established in different implementations of the present technology. As it will become apparent from the description herein further below, irrespective from a specific bitmask logic used (e.g., specific correspondence between which bit position is assigned to which object ID), that bitmask logic may be employed by the planning module when generating queries and/or when acquiring results indicative of target objects.

It is contemplated that bitwise operations, such as bitwise AND, OR, XOR, and NOT, can be performed by the computer system on one or more bitmasks in the grid structure for extracting information about presence of objects in target portions of the surroundings.

In a first broad aspect of the present technology, there is provided a method of controlling operation of a Self-Driving Car (SDC). The method is executable by processor(s) communicatively coupled to sensor(s) and control system(s) of the SDC. The method comprises, at a first moment in time, acquiring object data from the sensor(s) indicative of a plurality of objects in surroundings of the SDC, a given object from the plurality of objects being assigned with a respective identifier (ID). The method comprises, at a first moment in time, generating a grid structure having a plurality of cells, a given cell from the plurality of cells covering a corresponding portion of the surroundings. The method comprises, at a first moment in time, generating a bitmask for the given cell indicative of ID(s) of object(s) present in a first portion of the surroundings which is covered by at least the given cell. The method comprises, at a second moment in time, acquiring a request indicative of a target cell in the grid structure, the target cell covering a target portion of the surroundings. The method comprises, at a second moment in time, identifying ID(s) of target object(s) from the plurality of objects using the bitmask of the given cell, the target object(s) being present in the target portion of the surroundings. The method comprises, at a second moment in time, controlling operation of the SDC using the control system(s) while taking into account presence of the target object(s) in the target portion of the surroundings.

In some embodiments of the method, the method further comprises, at the first moment in time, generating a preliminary bitmask for the given cell, the preliminary bitmask being indicative of the ID(s) of object(s) present in the corresponding portion. The generating the bitmask for the given cell includes generating the bitmask by performing an operation on preliminary bitmasks of a cluster of cells.

In some embodiments of the method, the target cell is a target cluster of cells from the plurality of cells. The target cluster of cells covers the target portion of the surroundings. The target cluster of cells includes the given cell and an other given cell. The method further comprises, at the first moment in time, generating an other bitmask for the other given cell indicative of ID(s) of object(s) present in an other portion of the surroundings covered by an other cluster of cells from the plurality of cells, the other cluster of cells including the other given cell. The identifying ID(s) of target object(s) present in the target portion includes generating a target bitmask based on a combination of the bitmask of the given cell and the other bitmask of the other given cell, the target bitmask being indicative of the ID(s) of target object(s) present in the target portion.

In some embodiments of the method, the first cluster of cells is symmetrical to the second cluster of cells in the grid structure.

In some embodiments of the method, the given cell and the other given cell are diagonally opposite cells in the target cluster of cells.

In some embodiments of the method, the method further comprises generating bounding elements for the plurality of objects, a given bounding element for the given object occupying a larger portion of the surroundings of the SDC than the given object. The bitmask is indicative of the ID(s) of object(s) with corresponding bounding elements present in the corresponding portion.

In some embodiments of the method, the plurality of objects comprises an object of a first type, and an other object of a second type, the first type being different from the second type.

In some embodiments of the method, the bitmask is a sequence of N bits, an $i_{th}$ bit in the sequence of N bits being representative of presence of the given object from the plurality of objects with an $i_{th}$ ID.

In a second broad aspect of the present technology, there is provided a method of controlling operation of a Self-Driving Car (SDC), the method being executable by processor(s) communicatively coupled to sensor(s) and control system(s) of the SDC. The method comprises, at a first moment in time, acquiring object data from the sensor(s) indicative of a plurality of objects in surroundings of the SDC, a given object from the plurality of objects being assigned with a respective identifier (ID). The method comprises, at a first moment in time, generating a grid structure having a plurality of cells, a given cell from the plurality of cells covering a corresponding portion of the surroundings. The method comprises, at a first moment in time, generating a first bitmask for the given cell indicative of ID(s) of object(s) present in a first portion of the surroundings which is covered by a first cluster of cells from the plurality of cells, the first cluster of cells including the given cell and an other given cell. The method comprises, at a first moment in time, generating a second bitmask for the other given cell indicative of ID(s) of object(s) present in a second portion of the surroundings which is covered by a second cluster of cells from the plurality of cells, the first cluster of cells including the given cell and an other given cell, the first cluster of cells at least partially overlapping with the second cluster of cells in addition to the given cell and the other given cell. The method comprises, at a second moment in time, acquiring a request indicative of a target cluster of cells in the grid structure, the target cluster of cells covering a target portion of the surroundings, the target cluster of cells including the given cell and an other given cell. The method comprises, at a second moment in time, identifying ID(s) of target object(s) from the plurality of objects using the first bitmask of the given cell and the second bitmask of the other given cell, the target object(s) being present in the target portion of the surroundings. The method comprises, at a second moment in time, controlling operation of the SDC using the control system(s) while taking into account presence of the target object(s) in the target portion of the surroundings.

In some embodiments of the method, the identifying the ID(s) of the target object(s) includes generating a target bitmask by performing an operation on the first bitmask and the second bitmask, the target bitmask being indicative of the ID(s) of the target object(s).

In a third broad aspect of the present technology, there is provided an electronic device for controlling operation of a Self-Driving Car (SDC), the SDC comprising sensor(s) and control system(s). The electronic device is configured to, at a first moment in time, acquire object data from the sensor(s) indicative of a plurality of objects in surroundings of the SDC, a given object from the plurality of objects being assigned with a respective identifier (ID). The electronic device is configured to, at a first moment in time, generate a grid structure having a plurality of cells, a given cell from the plurality of cells covering a corresponding portion of the surroundings. The electronic device is configured to, at a first moment in time, generate a bitmask for the given cell indicative of ID(s) of object(s) present in a first portion of the surroundings which is covered by at least the given cell. The electronic device is configured to, at a second moment in time, acquire a request indicative of a target cell in the grid structure, the target cell covering a target portion of the surroundings. The electronic device is configured to, at a second moment in time, identify ID(s) of target object(s) from the plurality of objects using the bitmask of the given cell, the target object(s) being present in the target portion of the surroundings. The electronic device is configured to, at a second moment in time, control operation of the SDC using the control system(s) while taking into account presence of the target object(s) in the target portion of the surroundings.

In some embodiments of the electronic device, the electronic device is further configured to, at the first moment in time, generate a preliminary bitmask for the given cell, the preliminary bitmask being indicative of the ID(s) of object(s) present in the corresponding portion. To generate the bitmask for the given cell includes the electronic device configured to generate the bitmask by performing an operation on preliminary bitmasks of a cluster of cells.

In some embodiments of the electronic device, the target cell is a target cluster of cells from the plurality of cells, the target cluster of cells covering the target portion of the surroundings, the target cluster of cells including the given cell and an other given cell, the electronic device further configured to, at the first moment in time, generate an other bitmask for the other given cell indicative of ID(s) of object(s) present in an other portion of the surroundings covered by an other cluster of cells from the plurality of cells, the other cluster of cells including the other given cell. To identify ID(s) of target object(s) present in the target portion includes the electronic device configured to generate a target bitmask based on a combination of the bitmask of the given cell and the other bitmask of the other given cell, the target bitmask being indicative of the ID(s) of target object(s) present in the target portion.

In some embodiments of the electronic device, the first cluster of cells is symmetrical to the second cluster of cells in the grid structure.

In some embodiments of the electronic device, the given cell and the other given cell are diagonally opposite cells in the target cluster of cells.

In some embodiments of the electronic device, the electronic device is further configured to generate bounding elements for the plurality of objects, a given bounding element for the given object occupying a larger portion of the surroundings of the SDC than the given object. The bitmask is indicative of the ID(s) of object(s) with corresponding bounding elements present in the corresponding portion.

In some embodiments of the electronic device, the plurality of objects comprises an object of a first type, and an other object of a second type, the first type being different from the second type.

In some embodiments of the electronic device, the bitmask is a sequence of N bits, an $i_{th}$ bit in the sequence of N bits being representative of presence of the given object from the plurality of objects with an $i_{th}$ ID.

In a fourth broad aspect of the present technology, there is provided an electronic device for controlling operation of a Self-Driving Car (SDC), the SDC comprising sensor(s) and control system(s) of the SDC. The electronic device is configured to, at a first moment in time, acquire object data from the sensor(s) indicative of a plurality of objects in surroundings of the SDC, a given object from the plurality of objects being assigned with a respective identifier (ID). The electronic device is configured to, at a first moment in time, generate a grid structure having a plurality of cells, a given cell from the plurality of cells covering a corresponding portion of the surroundings. The electronic device is configured to, at a first moment in time, generate a first bitmask for the given cell indicative of ID(s) of object(s) present in a first portion of the surroundings which is covered by a first cluster of cells from the plurality of cells, the first cluster of cells including the given cell and an other given cell. The electronic device is configured to, at a first moment in time, generate a second bitmask for the other given cell indicative of ID(s) of object(s) present in a second portion of the surroundings which is covered by a second cluster of cells from the plurality of cells, the first cluster of cells including the given cell and an other given cell, the first cluster of cells at least partially overlapping with the second cluster of cells in addition to the given cell and the other given cell. The electronic device is configured to, at a second moment in time, acquire a request indicative of a target cluster of cells in the grid structure, the target cluster of cells covering a target portion of the surroundings, the target cluster of cells including the given cell and an other given cell. The electronic device is configured to, at a second moment in time, identify ID(s) of target object(s) from the plurality of objects using the first bitmask of the given cell and the second bitmask of the other given cell, the target object(s) being present in the target portion of the surroundings. The electronic device is configured to, at a second moment in time, control operation of the SDC using the control system(s) while taking into account presence of the target object(s) in the target portion of the surroundings.

In some embodiments of the electronic device, to identify the ID(s) of the target object(s) includes the electronic device configured to generate a target bitmask by performing an operation on the first bitmask and the second bitmask, the target bitmask being indicative of the ID(s) of the target object(s).

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
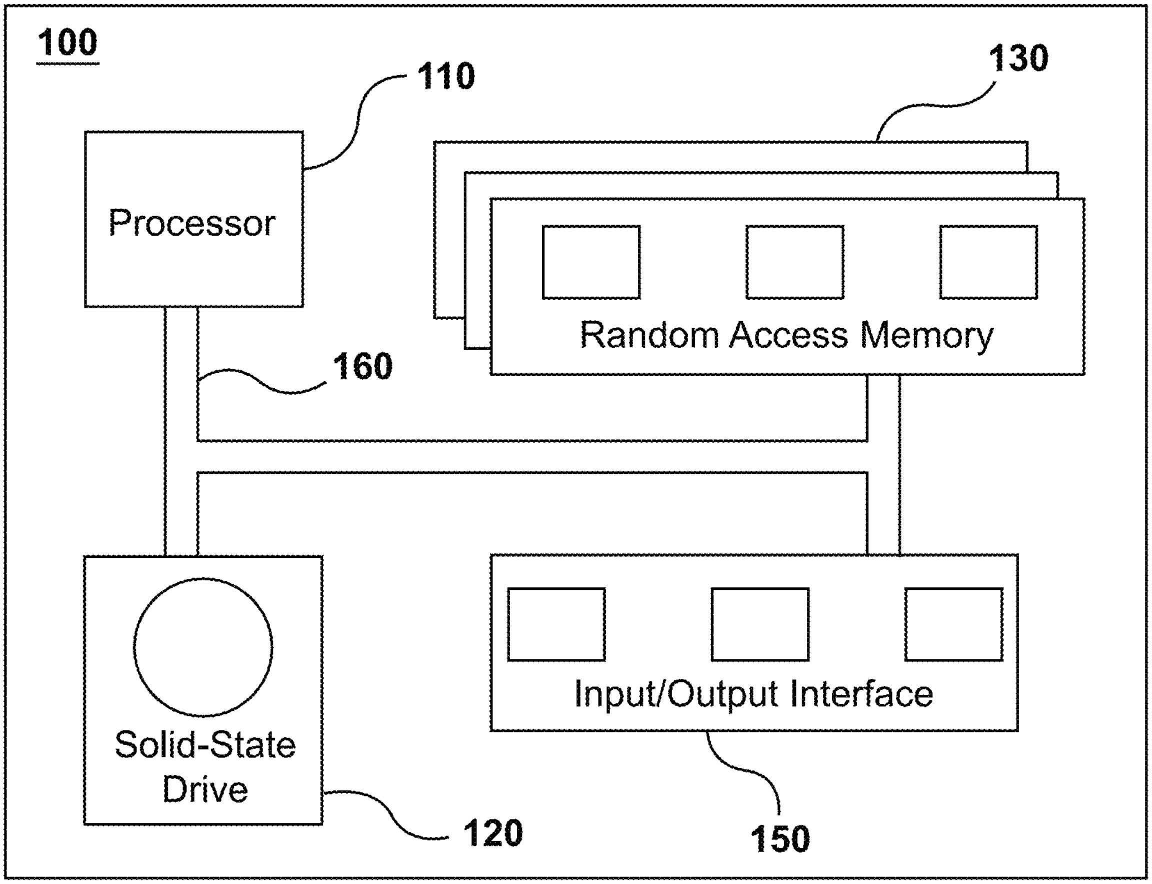
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

FIG. 1 illustrates a diagram of a computing environment 100 in accordance with an embodiment of the present technology. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Networked Computing Environment

Figure 2:
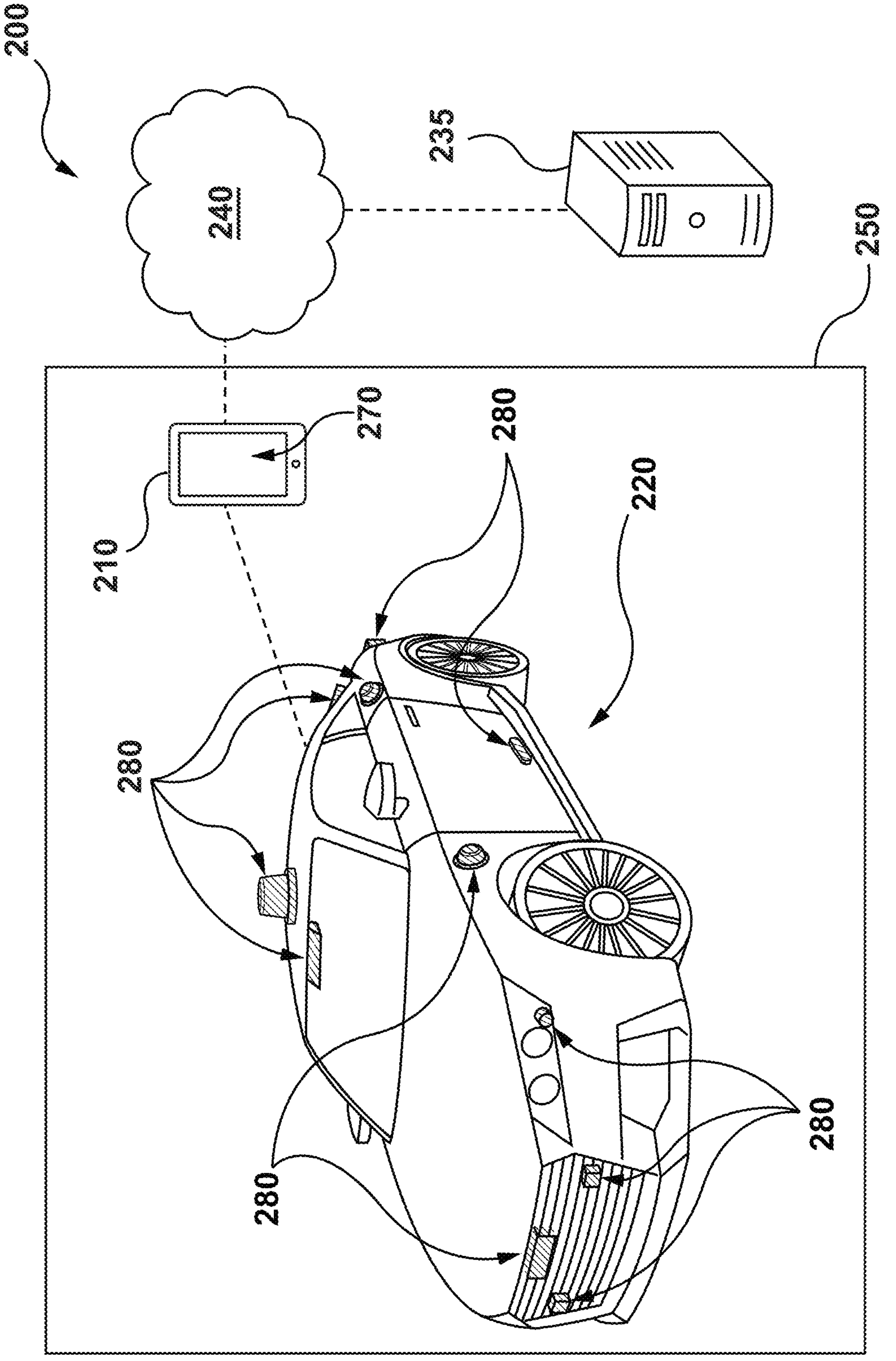
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

LIDAR System

According to the non-limiting embodiments of the present technology and as is illustrated in FIG. 2, the vehicle 220 is equipped with at least one Light Detection and Ranging (LIDAR) system, such as a LIDAR system 300, for gathering information about surroundings 250 of the vehicle 220. While only described herein in the context of being attached to the vehicle 220, it is also contemplated that the LIDAR system 300 could be a stand-alone operation or connected to another system.

Depending on the embodiment, the vehicle 220 could include more or fewer LIDAR systems 300 than illustrated. Depending on the particular embodiment, choice of inclusion of particular ones of the plurality of sensor systems 280 could depend on the particular embodiment of the LIDAR system 300. The LIDAR system 300 could be mounted, or retrofitted, to the vehicle 220 in a variety of locations and/or in a variety of configurations.

For example, depending on the implementation of the vehicle 220 and the LIDAR system 300, the LIDAR system 300 could be mounted on an interior, upper portion of a windshield of the vehicle 220. Nevertheless, as illustrated in FIG. 2, other locations for mounting the LIDAR system 300 are within the scope of the present disclosure, including on a back window, side windows, front hood, rooftop, front grill, front bumper or the side of the vehicle 220. In some cases, the LIDAR system 300 can even be mounted in a dedicated enclosure mounted on the top of the vehicle 220.

In some non-limiting embodiments, such as that of FIG. 2, a given one of the plurality of LIDAR systems 300 is mounted to the rooftop of the vehicle 220 in a rotatable configuration. For example, the LIDAR system 300 mounted to the vehicle 220 in a rotatable configuration could include at least some components that are rotatable 360 degrees about an axis of rotation of the given LIDAR system 300. When mounted in rotatable configurations, the given LIDAR system 300 could gather data about most of the portions of the surroundings 250 of the vehicle 220.

In some non-limiting embodiments of the present technology, such as that of FIG. 2, the LIDAR systems 300 is mounted to the side, or the front grill, for example, in a non-rotatable configuration. For example, the LIDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LIDAR system 300, it is configured to capture data about the surroundings 250 of the vehicle 220 used, for example, for building a multi-dimensional map of objects in the surroundings 250 of the vehicle 220. Details relating to the configuration of the LIDAR systems 300 to capture the data about the surroundings 250 of the vehicle 220 will now be described.

It should be noted that although in the description provided herein the LIDAR system 300 is implemented as a Time of Flight LIDAR system—and as such, includes respective components suitable for such implementation thereof—other implementations of the LIDAR system 300 are also possible without departing from the scope of the present technology. For example, in certain non-limiting embodiments of the present technology, the LIDAR system 300 may also be implemented as a Frequency-Modulated Continuous Wave (FMCW) LIDAR system according to one or more implementation variants and based on respective components thereof as disclosed in a Russian Patent Application 2020117983 filed Jun. 1, 2020 and entitled "LIDAR DETECTION METHODS AND SYSTEMS"; the content of which is hereby incorporated by reference in its entirety.

Figure 3:
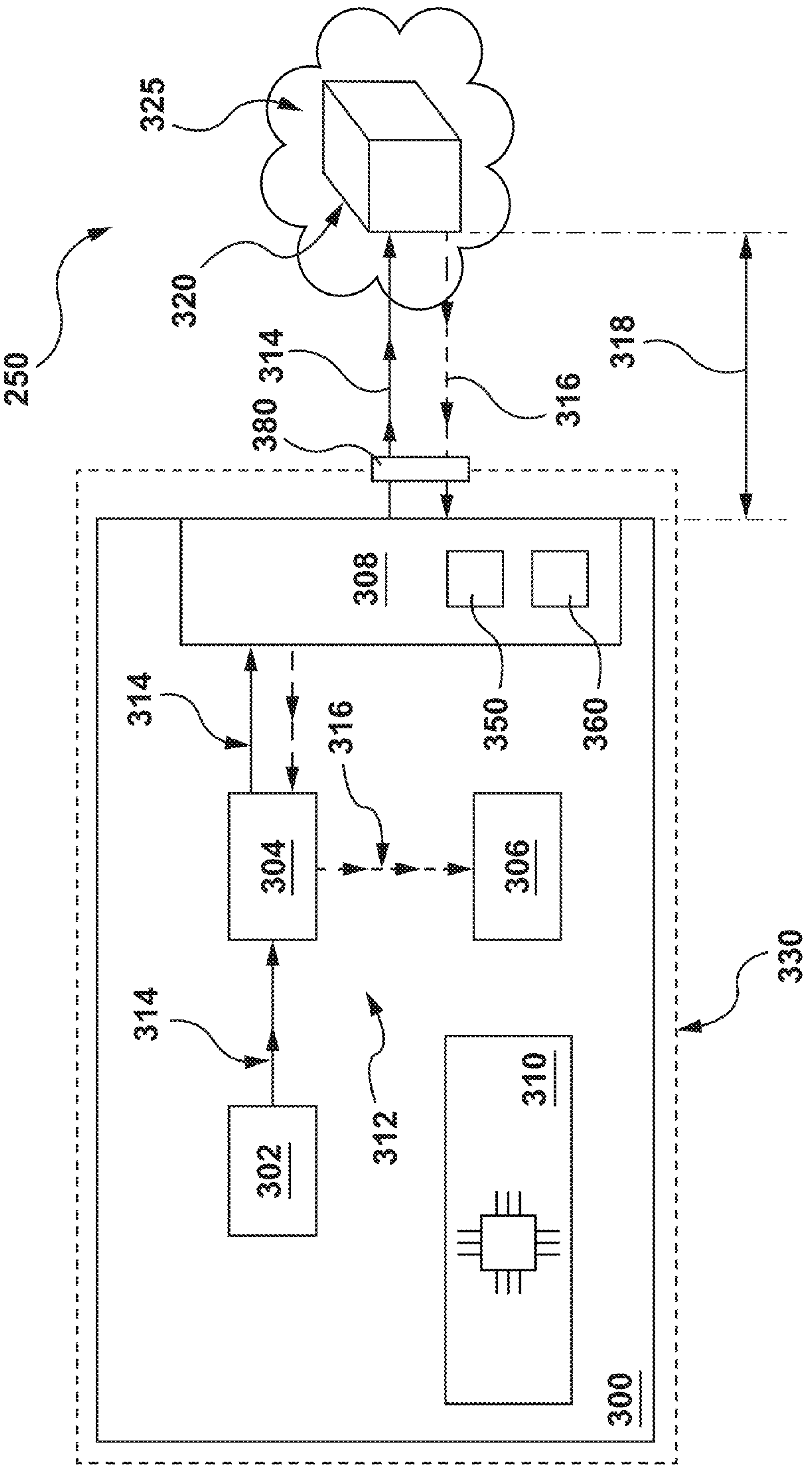
FIG. 3 depicts a schematic diagram of an example LIDAR system implemented in accordance with certain non-limiting embodiments of the present technology.

With reference to FIG. 3, there is depicted a schematic diagram of one particular embodiment of the LIDAR system 300 implemented in accordance with certain non-limiting embodiments of the present technology.

Broadly speaking, the LIDAR system 300 includes a variety of internal components including, but not limited to: (i) a light source 302 (also referred to as a "laser source" or a "radiation source"), (ii) a beam splitting element 304, (iii) a scanning unit 308 (also referred to as a "scanner", and "scanner assembly"), (iv) a detection unit 306 (also referred to herein as a "detection system", "receiving assembly", or a "detector"), and (v) a controller 310. It is contemplated that in addition to the components non-exhaustively listed above, the LIDAR system 300 could include a variety of sensors (such as, for example, a temperature sensor, a moisture sensor, etc.) which are omitted from FIG. 3 for sake of clarity.

In certain non-limiting embodiments of the present technology, one or more of the internal components of the LIDAR system 300 are disposed in a common housing 330 as depicted in FIG. 3. In some embodiments of the present technology, the controller 310 could be located outside of the common housing 330 and communicatively connected to the components therein. As it will become apparent from the description herein further below, the housing 330 has a window 380 towards the surroundings of the vehicle 220 for allowing beams of light exiting the housing 330 and entering the housing 330.

Generally speaking, the LIDAR system 300 operates as follows: the light source 302 of the LIDAR system 300 emits pulses of light, forming an output beam 314; the scanning unit 308 scans the output beam 314 through the window 380 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The light source 302 and the scanning unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LIDAR system 300. Once the output beam 314 reaches the object 320, the object 320 generally reflects at least a portion of light from the output beam 314, and some of the reflected light beams may return back towards the LIDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

Accordingly, the input beam 316 is captured and detected by the LIDAR system 300 via the detection unit 306. In response, the detection unit 306 is then configured to generate one or more representative data signals. For example, the detection unit 306 may generate an output electrical signal (not depicted) that is representative of the input beam 316. The detection unit 306 may also provide the so-generated electrical signal to the controller 310 for further processing. Finally, by measuring a time between emitting the output beam 314 and receiving the input beam 316 the distance 318 to the object 320 is calculated by the controller 310.

As will be described in more detail below, the beam splitting element 304 is utilized for directing the output beam 314 from the light source 302 to the scanning unit 308 and for directing the input beam 316 from the scanning unit to the detection unit 306.

Use and implementations of these components of the LIDAR system 300, in accordance with certain non-limiting embodiments of the present technology, will be described immediately below.

Light Source

The light source 302 is communicatively coupled to the controller 310 and is configured to emit light having a given operating wavelength. To that end, in certain non-limiting embodiments of the present technology, the light source 302 could include at least one laser pre-configured for operation at the given operating wavelength. The given operating wavelength of the light source 302 may be in the infrared, visible, and/or ultraviolet portions of the electromagnetic spectrum. For example, the light source 302 may include at least one laser with an operating wavelength between about 650 nm and 1150 nm. Alternatively, the light source 302 may include a laser diode configured to emit light at a wavelength between about 800 nm and about 1000 nm, between about 850 nm and about 950 nm, or between about 1300 nm and about 1600 nm. In certain other embodiments, the light source 302 could include a light emitting diode (LED).

Beam Splitting Element

With continued reference to FIG. 3, there is further provided the beam splitting element 304 disposed in the housing 330. For example, as previously mentioned, the beam splitting element 304 is configured to direct the output beam 314 from the light source 302 towards the scanning unit 308. The beam splitting element 304 is also arranged and configured to direct the input beam 316 reflected off the object 320 to the detection unit 306 for further processing thereof by the controller 310.

In a specific non-limiting example, the beam splitting element 304 can be implemented as a fiber-optic-based beam splitter component that may be of a type available from OZ Optics Ltd. of 219 Westbrook Rd Ottawa, Ontario K0A 1L0 Canada. It should be expressly understood that the beam splitting element 304 can be implemented in any other suitable equipment.

Internal Beam Paths

As is schematically depicted in FIG. 3, the LIDAR system 300 forms a plurality of internal beam paths 312 along which the output beam 314 (generated by the light source 302) and the input beam 316 (received from the surroundings 250) propagate. Specifically, light propagates along the internal beam paths 312 as follows: the light from the light source 302 passes through the beam splitting element 304, to the scanning unit 308 and, in turn, the scanning unit 308 directs the output beam 314 outward towards the surroundings 250.

Similarly, the input beam 316 follows the plurality of internal beam paths 312 to the detection unit 306. Specifically, the input beam 316 is directed by the scanning unit 308 into the LIDAR system 300 through the beam splitting element 304, toward the detection unit 306. In some implementations, the LIDAR system 300 could be arranged with beam paths that direct the input beam 316 directly from the surroundings 250 to the detection unit 306 (without the input beam 316 passing through the scanning unit 308).

It should be noted that, in various non-limiting embodiments of the present technology, the plurality of internal beam paths 312 may include a variety of optical components. For example, the LIDAR system 300 may include one or more optical components configured to condition, shape, filter, modify, steer, or direct the output beam 314 and/or the input beam 316. For example, the LIDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

Scanning Unit

Generally speaking, the scanning unit 308 steers the output beam 314 in one or more directions downrange towards the surroundings 250. The scanning unit 308 is communicatively coupled to the controller 310. As such, the controller 310 is configured to control the scanning unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanning unit 308 during operation.

In certain non-limiting embodiments of the present technology, the controller 310 is configured to cause the scanning unit 308 to scan the output beam 314 over a variety of horizontal angular ranges and/or vertical angular ranges; the total angular extent over which the scanning unit 308 scans the output beam 314 is sometimes referred to as the field of view (FOV). It is contemplated that the particular arrangement, orientation, and/or angular ranges could depend on the particular implementation of the LIDAR system 300. The field of view generally includes a plurality of regions of interest (ROIs), defined as portions of the FOV which may contain, for instance, objects of interest. In some implementations, the scanning unit 308 can be configured to further investigate a selected region of interest (ROI) 325. The ROI 325 of the LIDAR system 300 may refer to an area, a volume, a region, an angular range, and/or portion(s) of the surroundings 250 about which the LIDAR system 300 may be configured to scan and/or can capture data.

It should be noted that a location of the object 320 in the surroundings 250 of the vehicle 220 may be overlapped, encompassed, or enclosed at least partially within the ROI 325 of the LIDAR system 300.

According to certain non-limiting embodiments of the present technology, the scanning unit 308 may be configured to scan the output beam 314 horizontally and/or vertically, and as such, the ROI 325 of the LIDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

The scanning unit 308 includes a first reflective component 350 and a second reflective component 360. The first reflective component 350 is configured to redirect the output beam 314 from the beam splitting component towards the second reflective component 350 while spreading the output beam along a first axis. The second reflective component 360 is configured to redirect the output beam 314 from the first reflective component 350 towards the surroundings 250 (through the window 380 of the housing 330) while spreading the output beam along a second axis. The second axis can be perpendicular and/or orthogonal to the first axis. As such, so-redirecting and so-spreading the output beam 314 by the combination of the first reflective component 350 and the second reflective component 360 allows to scan the surroundings 250 of the vehicle 220 along at least two perpendicular/orthogonal axes.

Returning to the description of FIG. 3, the LIDAR system 300 may thus make use of the predetermined scan pattern to generate a point cloud substantially covering the ROI 325 of the LIDAR system 300. Again, this point cloud of the LIDAR system 300 may be used to render a multi-dimensional map of objects in the surroundings 250 of the vehicle 220.

Detection Unit

According to certain non-limiting embodiments of the present technology, the detection unit 306 is communicatively coupled to the controller 310 and may be implemented in a variety of ways. According to the present technology, the detection unit 306 includes a photodetector, but could include (but is not limited to) a photoreceiver, optical receiver, optical sensor, detector, optical detector, optical fibers, and the like. As mentioned above, in some non-limiting embodiments of the present technology, the detection unit 306 may be configured to acquire or detects at least a portion of the input beam 316 and produces an electrical signal that corresponds to the input beam 316. For example, if the input beam 316 includes an optical pulse, the detection unit 306 may produce an electrical current or voltage pulse that corresponds to the optical pulse detected by the detection unit 306.

It is contemplated that, in various non-limiting embodiments of the present technology, the detection unit 306 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the detection unit 306 may also include circuitry that performs signal amplification, sampling, filtering, signal conditioning, analog-to-digital conversion, time-to-digital conversion, pulse detection, threshold detection, rising-edge detection, falling-edge detection, and the like. For example, the detection unit 306 may include electronic components configured to convert a received photocurrent (e.g., a current produced by an APD in response to a received optical signal) into a voltage signal. The detection unit 306 may also include additional circuitry for producing an analog or digital output signal that corresponds to one or more characteristics (e.g., rising edge, falling edge, amplitude, duration, and the like) of a received optical pulse.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LIDAR system 300 and/or may provide signals to the other internal components of the LIDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LIDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the detection unit 306, the controller 310 could also be configured to provide control signals to, and potentially receive diagnostics data from, the light source 302 and the scanning unit 308.

As previously stated, the controller 310 is communicatively coupled to the light source 302, the scanning unit 308, and the detection unit 306. In some non-limiting embodiments of the present technology, the controller 310 may be configured to receive electrical trigger pulses from the light source 302, where each electrical trigger pulse corresponds to the emission of an optical pulse by the light source 302. The controller 310 may further provide instructions, a control signal, and/or a trigger signal to the light source 302 indicating when the light source 302 is to produce optical pulses indicative, for example, of the output beam 314.

Just as an example, the controller 310 may be configured to send an electrical trigger signal that includes electrical pulses, so that the light source 302 emits an optical pulse, representable by the output beam 314, in response to each electrical pulse of the electrical trigger signal. It is also contemplated that the controller 310 may cause the light source 302 to adjust one or more characteristics of output beam 314 produced by the light source 302 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LIDAR system 300 and one or more objects in the field of view, as will be described further below. The time of flight is based on timing information associated with (i) a first moment in time when a given optical pulse (for example, of the output beam 314) was emitted by the light source 302, and (ii) a second moment in time when a portion of the given optical pulse (for example, from the input beam 316) was detected or received by the detection unit 306. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from the detection unit 306, an electrical signal generated in response to receiving the portion of the given optical pulse from the input beam 316.

In other non-limiting embodiments of the present technology, where the beam splitting element 304 is configured to split the output beam 314 into the scanning beam (not depicted) and the reference beam (not depicted), the first moment in time may be a moment in time of receiving, from the detection unit 306, a first electrical signal generated in response to receiving a portion of the reference beam. Accordingly, in these embodiments, the second moment in time may be determined as the moment in time of receiving, by the controller 310 from the detection unit 306, a second electrical signal generated in response to receiving an other portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-light value T, in a sense, a "round-trip" time for the emitted pulse to travel from the LIDAR system 300 to the object 320 and back to the LIDAR system 300. The controller 310 is thus broadly configured to determine the distance 318 in accordance with the following equation:

$$D = \frac{c \cdot T}{2}, \quad (1)$$

wherein D is the distance 318, T is the time-of-flight value, and c is the speed of light (approximately $3.0\times10^8$ m/s).

As previously alluded to, the LIDAR system 300 may be used to determine the distance 318 to one or more other potential objects located in the surroundings 250. By scanning the output beam 314 across the ROI 325 of the LIDAR system 300 in accordance with the predetermined scan pattern, the controller 310 is configured to map distances (similar to the distance 318) to respective data points within the ROI 325 of the LIDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LIDAR system 300. It is contemplated that the LIDAR system 300 may be configured to repeatedly/iteratively capture and/or generate point clouds at any suitable rate for a given application.

It should be noted that such multi-dimensional maps may be recorded and stored as part of log data associated with the vehicle 220. As a result, point cloud data captured by LIDAR systems in a fleet of vehicles may be stored for later use. Furthermore, multi-dimensional maps captured by a given LIDAR system are used to localize the SDC during operation. How point cloud data captured by the LIDAR system during operation may be used for localizing the vehicle 220 will become apparent from the description herein further below.

Autonomous Driving Processing Pipeline

Figure 4:
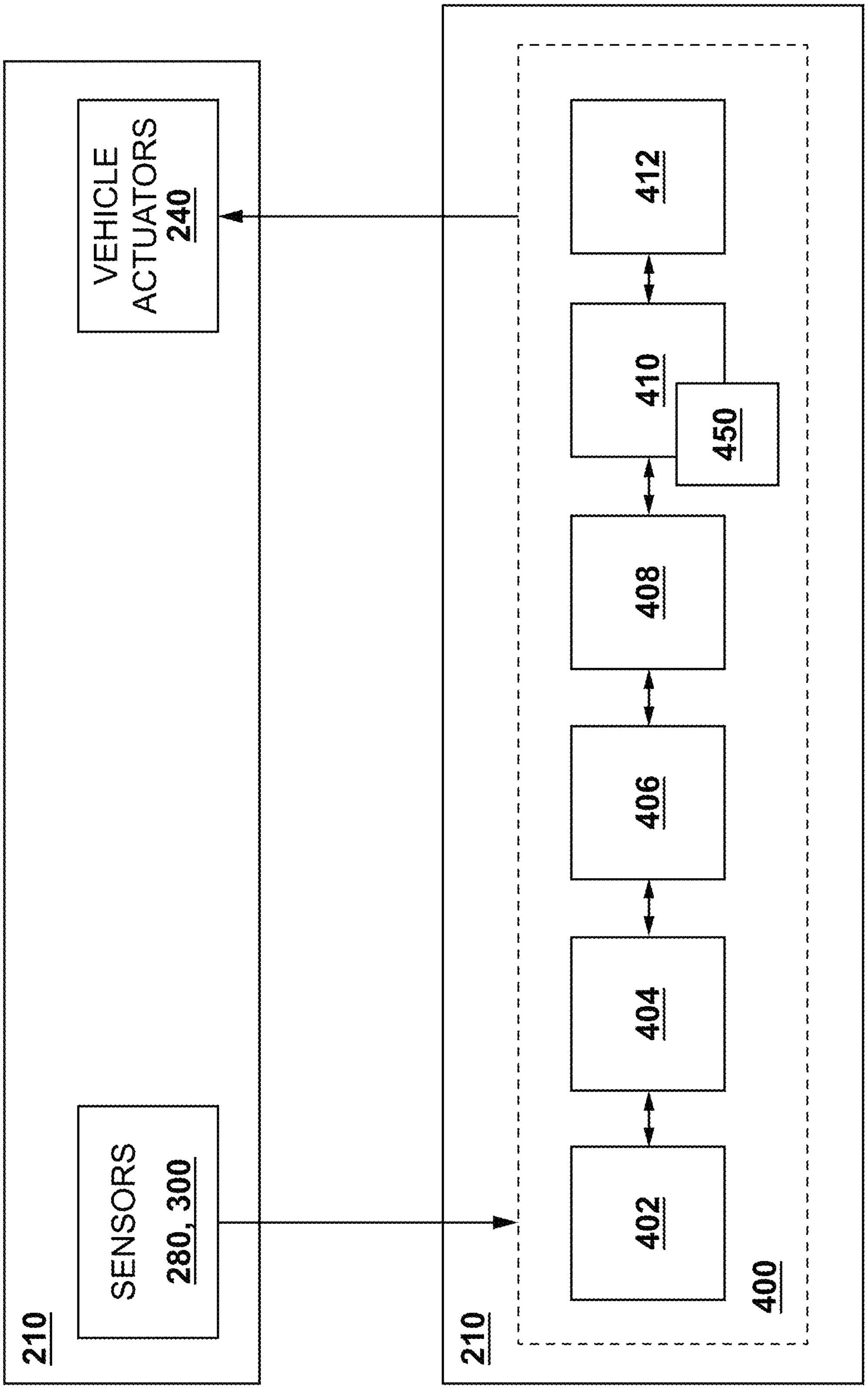
FIG. 4 depicts a schematic diagram of a processing pipeline executed by an electronic device of FIG. 2, in accordance with some embodiments of the present technology.

With reference to FIG. 4, there is depicted a schematic representation of a processing pipeline 400 executable by the electronic device 210 in at least some embodiments of the present technology. The electronic device 210 may be configured to execute the processing pipeline 400 for controlling operation of the vehicle 220 based on inter alia captured sensor data. It is contemplated that the processing pipeline 400 may be employed by the electronic device 210 in a cyclical manner.

Broadly speaking, a control cycle or loop of an autonomous vehicle represents a frequency at which the electronic device 210 processes sensor data, generates plans and/or trajectories, and sends commands to the actuators to adjust a vehicle's behavior. The electronic device 210 is configured to execute multiple control loops for continuously monitoring the vehicle's surroundings, making decisions, and executing actions to ensure safe and efficient operation. The duration of the control loop determines how quickly the vehicle can respond to changes in its surroundings and adjust its trajectory or speed accordingly. The processing periodicity of the control loop varies depending on the specific implementation of an autonomous vehicle system and its requirements. It can range from milliseconds to several tens of milliseconds, depending on factors such as the complexity of the surroundings, the speed of the vehicle 220, the desired level of responsiveness, and the like. A faster control loop, with a shorter processing periodicity, allows for more precise and agile control of the vehicle 220 but may require more computational resources. On the other hand, a slower control loop, with a longer processing periodicity, may be more computationally efficient but could result in less real-time responsiveness.

Broadly speaking, the processing pipeline 400 comprises a series of interconnected modules that analyze and interpret sensor data to enable real-time decision-making and control of the vehicle 220 in its surroundings. By integrating various sensor inputs and leveraging a plurality of algorithms, the processing pipeline 400 may be used for optimizing and/or controlling the vehicle's navigation, obstacle detection capabilities, and overall safety during operation.

The processing pipeline 400 comprises a data acquisition module 402 configured to acquire real-time data, where multiple sensors (e.g., cameras, lidar, radar, and the like) capture data about the surroundings. It is contemplated that the data acquisition module 402 may be communicatively coupled to one or more sensors of the vehicle 220, such as the LIDAR system 300 in FIG. 3, for example.

In this embodiment, the data acquisition model 402 is configured to provide at least some of the acquired data to a pre-processing module 404. Broadly speaking, the pre-processing module 404 may be configured to process acquired sensor data to remove noise, calibrate sensors, ensure data consistency, and the like. It is contemplated that one or more pre-processing techniques such as filtering, normalization, and synchronization, for example, may be used by the electronic device 210 to enhance the quality and/or reliability of sensor data to be used downstream in the processing pipeline 400.

In this embodiment, pre-processed data may be further provided to a perception module 406. Broadly speaking, the perception module 406 is configured to employ computer vision, machine learning, and a variety of sensor fusion techniques to extract meaningful information from the pre-processed and/or raw sensor data. The perception module 406 may be employed by the electronic device 210 for performing tasks such as object detection, object recognition, and object tracking, for example, for enabling the identification of vehicles, pedestrians, traffic signs, and other types of objects in the surroundings of the vehicle 220. It can be said that the perception module 406 may be configured to combine data from one or more sensors and generate a detailed representation of the surroundings of the vehicle 220. As it will be discussed below, the perception module 406 may generate bounding elements for respective objects detected in the surroundings.

In this embodiment, the processing pipeline 400 comprises a localization module 408. Broadly speaking, the localization module 408 is configured to determine a location and/or orientation of the vehicle 220 relative to other objects in the surroundings. It is contemplated that the localization module 408 may be configured to use a variety of localization techniques for determining the location and/or orientation of the vehicle 220 in the surroundings such as simultaneous localization and mapping (SLAM), global positioning system (GPS), and the like. It should be noted that a location and/or orientation of the vehicle 220 in the surroundings may be used downstream in the processing pipeline 400 for planning purposes, for example, allowing the electronic device 210 to make informed decisions regarding potential trajectories, paths, and maneuvers to be performed by the vehicle 220.

In this embodiment, the electronic device 210 is configured to employ a planning module 410 to plan motion of the vehicle 220 in its surroundings. Broadly speaking, the planning module 410 in the processing pipeline 400 is a combination of computer-implemented algorithms that are configured to analyze data acquired from other modules of the processing pipeline 400, generate planned trajectory data for operating the vehicle 220 based on the received data.

In this embodiment, the processing pipeline 400 comprises a control module 412 configured to use data generated by the planning module 410 to adjust the vehicle's actuators, including the steering, acceleration, and/or braking systems. For example, by continuously monitoring the vehicle's state and comparing it with the desired trajectory, the control module 412 may dynamically adjust the control signals, ensuring vehicle control in accordance with a planned trajectory and responsiveness to changing environmental conditions.

It can be said that the planning module 410 can update its decisions based on real-time sensor data and/or feedback from the control system of the vehicle 220. For example, the planning module 410 may update its decisions from one control cycle to another and dynamically adjust a planned trajectory to account for changing road conditions, unexpected obstacles, and/or changes in the surroundings.

It should be noted that the planning module 410 interfaces with inter alia the perception module 406 and the localization module 408. The planning module 410 may analyze perception data and localization data to make informed decisions based on the received data and generate trajectory data for the control module 412.

It is contemplated that the planning module 410 is configured to estimate distances between the vehicle 220 and objects in its surroundings for executing at least some planning tasks. A variety of planning tasks may require distance information for generating a trajectory for the vehicle 220.

In some embodiments, the planning module 410 may be configured to perform path planning for the vehicle 220. In these embodiments, the planning module 410 may generate a high-level route from the vehicle's 220 current location to the destination, considering factors like road network, traffic, and user preferences. In these embodiments, the planning module 410 may receive a global route as input and generate a trajectory, considering the surroundings of the SDC (including objects/obstacles), and vehicle dynamics. In these embodiments, the planning module 410 may perform lane changing planning by determining when and how to safely change lanes, considering factors such as traffic conditions, objects/obstacles, vehicle speed, and signaling.

In other embodiments, the planning module 410 may be configured to perform behavior planning for the vehicle 220 and/or other objects in the surroundings. In these other embodiments, the planning module 410 may analyze the current traffic situation, and traffic rules to perform real-time decisions, such as stopping at a red light, yielding to pedestrians, or merging into traffic. In these other embodiments, the planning module 410 may be configured to plan one or more maneuvers such as overtaking, parking, or negotiating intersections by considering the vehicle's capabilities and the surroundings (including objects/obstacles).

In further embodiments, the planning module 410 may be configured to perform motion planning for the vehicle 220. In these further embodiments, the planning module 410 may be configured to detect and avoid potential collisions with objects in the surroundings by computing safe and efficient trajectories. In these further embodiments, the planning module 410 may be configured to plan paths that circumvent static or dynamic objects in the surroundings while considering the vehicle's kinematic constraints. In these further embodiments, the planning module 410 may be configured to optimize the vehicle's trajectory over a specific time horizon to minimize energy consumption, discomfort to passengers, and/or other predefined criteria.

In some embodiments of the present technology, the planning module 410 is configured to send one or more queries to a search engine 450 for identifying presence of object(s) in portions of the surroundings that is of interest for a given planning task.

Occupancy Search Engine

Figure 5:
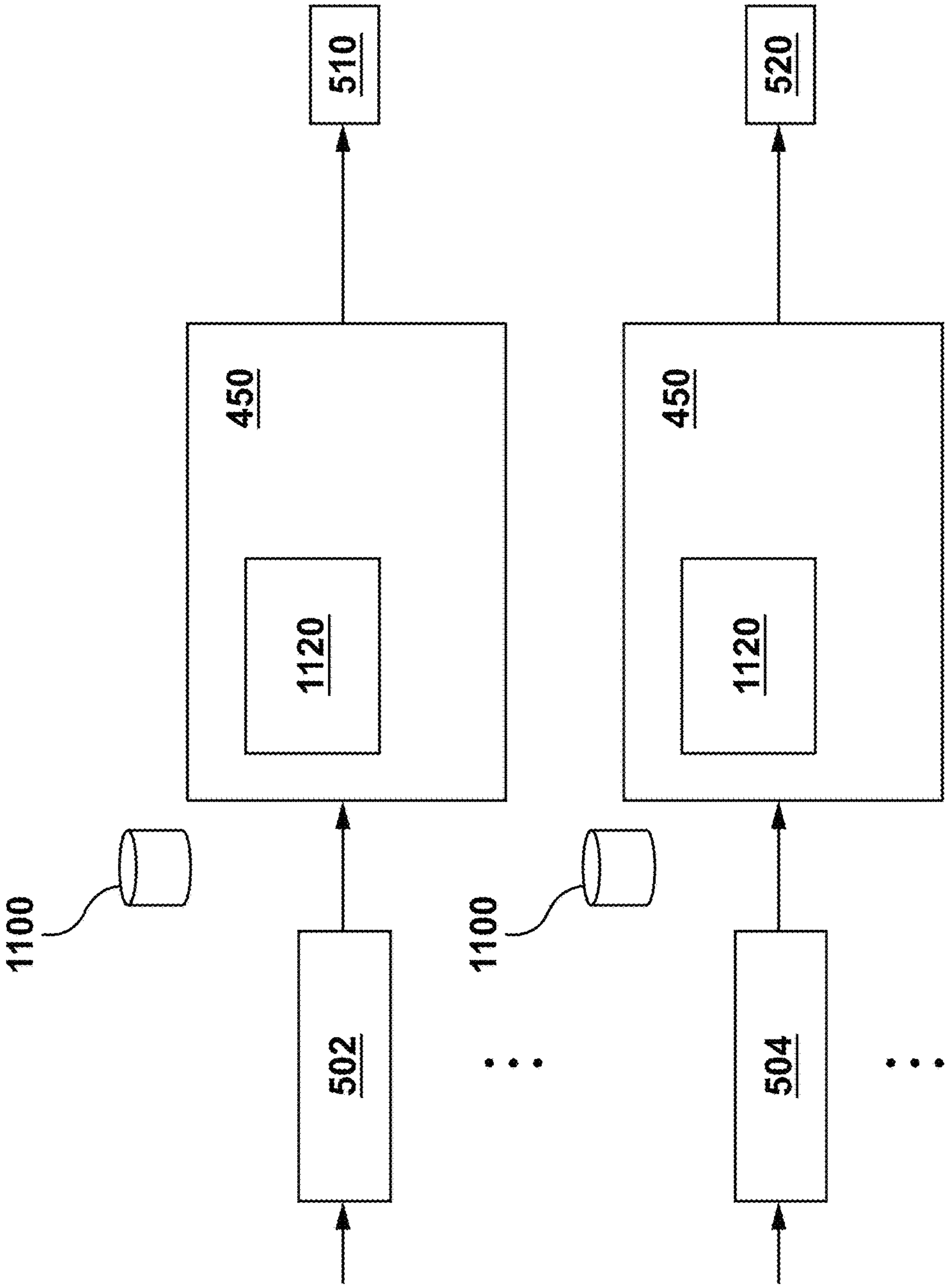
FIG. 5 depicts a schematic diagram of an occupancy search engine configured to receive queries from a planning module of FIG. 4, in accordance with some embodiments of the present technology.

With reference to FIG. 5, there is depicted the search engine 450 receiving a first query 502 and a second query 504 from the planning module 410 during a given control cycle executed by the electronic device 210. During the given control cycle, the electronic device 210 may be configured to provide data from one or more modules of the processing pipeline 400 as input to the planning module 410, which based on the inputted data can (i) generate inter alia the first and second queries 502 and 504 for object information in target portions of the surroundings, and (ii) use the retrieved data during one or more planning operations to be executed during the given control cycle.

For example, a given query may be indicative of a target portion of the surroundings to be searched. In this example, the first query 502 may be indicative of a first target portion of the surroundings of the vehicle 220 to be searched (corresponding to one or more cells of a grid structure covering that first target portion) and the second query 504 may be indicative of a second target portion of the surroundings to be searched (corresponding to one or more cells of a grid structure covering that second target portion). In this example, the first target portion of the surroundings may correspond to a current vicinity of the vehicle 220, in a form of one or more cells of a grid structure that cover a current estimated location of the vehicle 220 (e.g., generated by the localization module 408). In this example, the second target portion of the surroundings may correspond to a potential future vicinity of the vehicle 220, in a form of one or more cells of a grid structure that cover a potential future location of the vehicle 220 (e.g., generated by the planning module 410 for solving a given planning task).

In another example, a given query may be indicative of one or more classes of objects that are to be searched for in the target portion of the surroundings of the vehicle 220. In this other example, the first query 502 may be indicative of a first target portion of the surroundings of the vehicle 220 to be searched for pedestrians (e.g., first class of objects) and the second query 502 may be indicative of a second target portion of the surroundings of the vehicle 220 to be searched for vehicles (e.g., second class of objects). Developers of the present technology have realized that providing technical solutions that can search for both a target portion of the surroundings and a target class of objects, simultaneously (i.e., via a single query), may be advantageous if compared to other solutions where multiple queries are issued for extracting class-specific results and/or additional filtering operations are required for filtering non-class-specific results.

In some implementations, the query may be represented as "[type1, type2], x, y". The list of types or classes inside the structure is converted into a bitmask. It is contemplated that in some implementations, no additional information may be needed (cell coordinates, etc.) from the query, all can be computed via the data structures described herein.

In response to receiving the queries, the search engine 450 may be configured to access a cache 1100 maintaining a grid structure 1120 with codified object ID data. The grid structure 1120 will be discuss in greater details herein further below with reference to FIG. 11.

Broadly, the search engine 450 may use data from a given query for inter alia:

(i) identifying one or more target cells from the grid structure 1120 covering the target portion of the surroundings;

(ii) identifying one or more bitmasks (codified object ID data) for the one or more target cells; and (iii) performing one or more operations on the one or more bitmasks for generating a target bitmask indicative of IDs of target objects (e.g., class-specific) located in the target portion.

The search engine 450 is configured to generate a first response 510 for the first query 502, and a second response 520 for the second query 504. The electronic device 210 may be configured to provide the first and second responses 510 and 520 to the planning module 410 for executing one or more planning tasks.

A given response may be indicative of the target bitmask generated by the search engine 450 indicative of target object IDs. It should also be noted that the planning module 410 may be configured to issue a large number of queries similar to the first and second queries 502 and 504. Developers of the present technology have realized that reducing a computational cost of a given search operation by the search engine 450 is a scalable computational benefit especially when a large number of search operations are to be performed for the large number of queries issued by the planning module 410. How the electronic device 210 may be configured to generate the grid structure 1120 will now be described in greater details.

Occupancy Grid Structure

Figure 6:
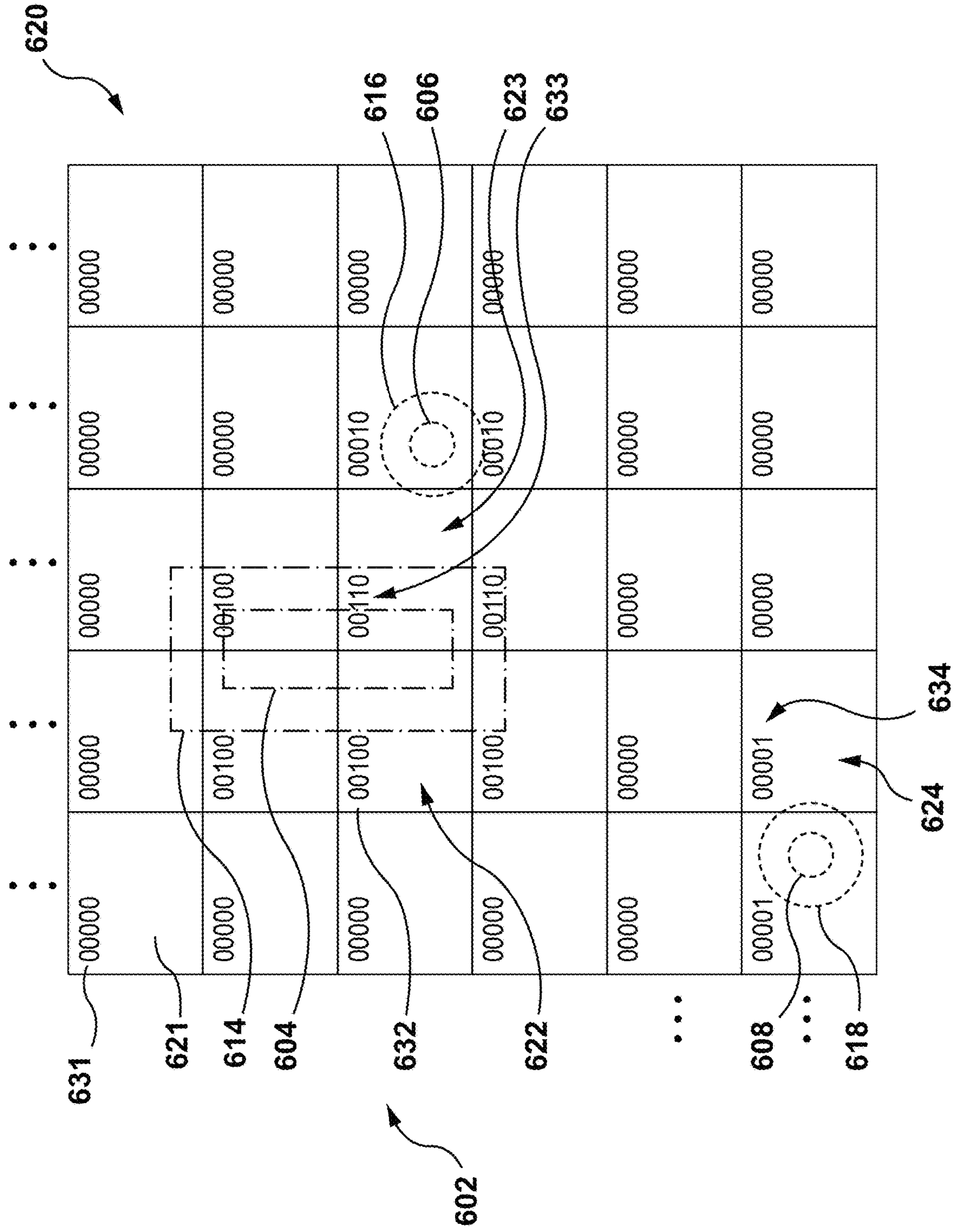
FIG. 6 depicts a grid structure with a plurality of cells assigned with respective preliminary bitmasks, in accordance with some embodiments of the present technology.

With reference to FIG. 6, there is depicted a graphical representation of object data 602 about objects in the surroundings of the vehicle 220 and a graph structure 620 overlaying the object data 602.

The electronic device 210 may be configured to acquire the object data 602 representative of three objects in the surroundings of the vehicle 220. In some embodiments, the electronic device 210 may receive the object data 602 from the perception module 406 and which comprises locations of objects in the surroundings and their respective Identifiers (IDs). For example, the electronic device 210 may acquire data indicative of inter alia a location of the object 604 assigned with an ID "2", a location of the object 606 assigned with an ID "3", a location of the object 608 assigned with an ID "4", and so forth.

In some embodiments, the electronic device 210 may be configured to generate bounding elements for respective objects received from the object data 602. In other embodiments, data representing the bounding elements may be received as part of the object data 602 and generated by the perception module 408, without departing from the scope of the present technology.

In this embodiment, the object 604 is associated with a bounding box 614, the object 606 is associated with a bounding circle 616, and the object 608 is associated with a bounding circle 618. Broadly speaking, the electronic device 210 may generate bounding elements for objects in the surroundings of the vehicle 220 to encapsulate their spatial extent in the surroundings. The bounding elements, such as boxes, spheres, circles, cylinders, pyramids, for example, can be generated based on an object position, dimensions, and orientation in the sensor's coordinate system and/or other suitable coordinate system. Optionally, the electronic device 210 may further refine bounding elements by taking into account the uncertainty associated with an object's estimated location and size, resulting in more accurate and/or reliable representations of the objects' boundaries.

In this embodiment, the electronic device 210 may be configured to generate and assign a preliminary bitmask for respective cells of the grid structure 620 based on whether or not the respective cell covers bounding elements and/or is within the bounding element of a given object.

Broadly speaking, a preliminary bitmask is a codified representation of IDs of objects (and/or bounding elements thereof) that are present in a portion of the surroundings that is covered by the corresponding cell. In one embodiment of the present technology, a preliminary bitmask is a sequence of N bits, where an $i_{th}$ bit in the sequence of N bits is representative of presence of the given object from the plurality of objects with an $i_{th}$ ID. In other words, it can be said that the preliminary bitmask encodes IDs of objects present and/or absent from a portion of the surroundings covered by the respective cell, as opposed to encoding a probability of that the respective cell covers a portion of the surroundings with an object, for example.

For greater clarity, let's consider a first example where the electronic device 210 is configured to generate a preliminary bitmask 631 for the cell 621 of the grid structure 620. In this first example, the electronic device 210 generates the bitmask 631 as "00000" for the cell 621. A given bitmask "00000" is indicative of that objects with IDs "0", "1", "2", "3", and "4" (and/or the corresponding bounding elements) are not present in the portion of the surroundings covered by the cell 621.

For greater clarity, let's consider a second example where the electronic device 210 is configured to generate a preliminary bitmask 632 for the cell 622 of the grid structure 620. In this second example, the electronic device 210 generate the bitmask 632 as "00100" for the cell 622. A given bitmask "00100" is indicative of that objects with IDs "0", "1", "3", and "4" (and/or the corresponding bounding elements) are not present in the portion of the surroundings covered by the cell 622 because a first bit position for ID "0", a second bit position for ID "1", a fourth bit position for ID "3", and a fifth bit position for ID "4" are all assigned with a value of "0". However, the given bitmask "00100" is also indicative of that object with IDs "2" (and/or the corresponding bounding element) is present in the portion of the surroundings covered by the cell 622 because a third bit position for ID "2" is assigned with a value of "1". In this embodiment, an object with the ID "2" is the object 604 with the bounding box 614.

For greater clarity, let's consider a third example where the electronic device 210 is configured to generate a preliminary bitmask 633 for the cell 623 of the grid structure 620. In this third example, the electronic device 210 generate the bitmask 633 as "00110" for the cell 623. A given bitmask "00110" is indicative of that objects with IDs "0", "1", and "4" (and/or the corresponding bounding elements) are not present in the portion of the surroundings covered by the cell 623 because a first bit position for ID "0", a second bit position for ID "1", and a fifth bit position for ID "4" are all assigned with a value of "0". However, the given bitmask "00110" is also indicative of that object with IDs "2" (and/or the corresponding bounding element) is present in the portion of the surroundings covered by the cell 623 because a third bit position for ID "2" is assigned with a value of "1", and that object with IDs "2" (and/or the corresponding bounding element) is present in the portion of the surroundings covered by the cell 623 because a fourth bit position for ID "3" is assigned with a value of "1". In this embodiment, an object with the ID "2" is the object 604 with the bounding box 614, and an object with the ID "3" is the object 606 with a bounding circle 616.

For greater clarity, let's consider a fourth example where the electronic device 210 is configured to generate a preliminary bitmask 634 for the cell 624 of the grid structure 620. In this fourth example, the electronic device 210 generate the bitmask 634 as "00001" for the cell 624. A given bitmask "00001" is indicative of that objects with IDs "0", "1", "2", and "3" (and/or the corresponding bounding elements) are not present in the portion of the surroundings covered by the cell 623 because a first bit position for ID "0", a second bit position for ID "1", a third bit position for ID "2", and a fourth bit position for ID "3" are all assigned with a value of "0". However, the given bitmask "00001" is also indicative of that object with IDs "4" (and more particularly the corresponding bounding circle 618) is present in the portion of the surroundings covered by the cell 624 because a fifth bit position for ID "4" is assigned with a value of "1". In this embodiment, an object with the ID "4" is the object 608 with the bounding circle 618.

In some embodiments, a given bit position in a sequence of bits in a preliminary bitmask may be indicative of a presence of an object in the corresponding portion of the surroundings covered by the given cell. In other embodiments, a given bit position in a sequence of bits in a preliminary bitmask may be indicative of a presence of a bounding element of an object in the corresponding portion of the surroundings covered by the given cell.

It is contemplated that the preliminary bitmasks for cells of the grid structure 620 may be used for generating one or more additional bitmasks for the respective cells. Developers of the present technology have devised methods and electronic devices for encoding object ID data, via a bitmask, about one or more objects located in a cluster of cells neighbouring a given cell for which the bitmask is being generated.

Figure 7:
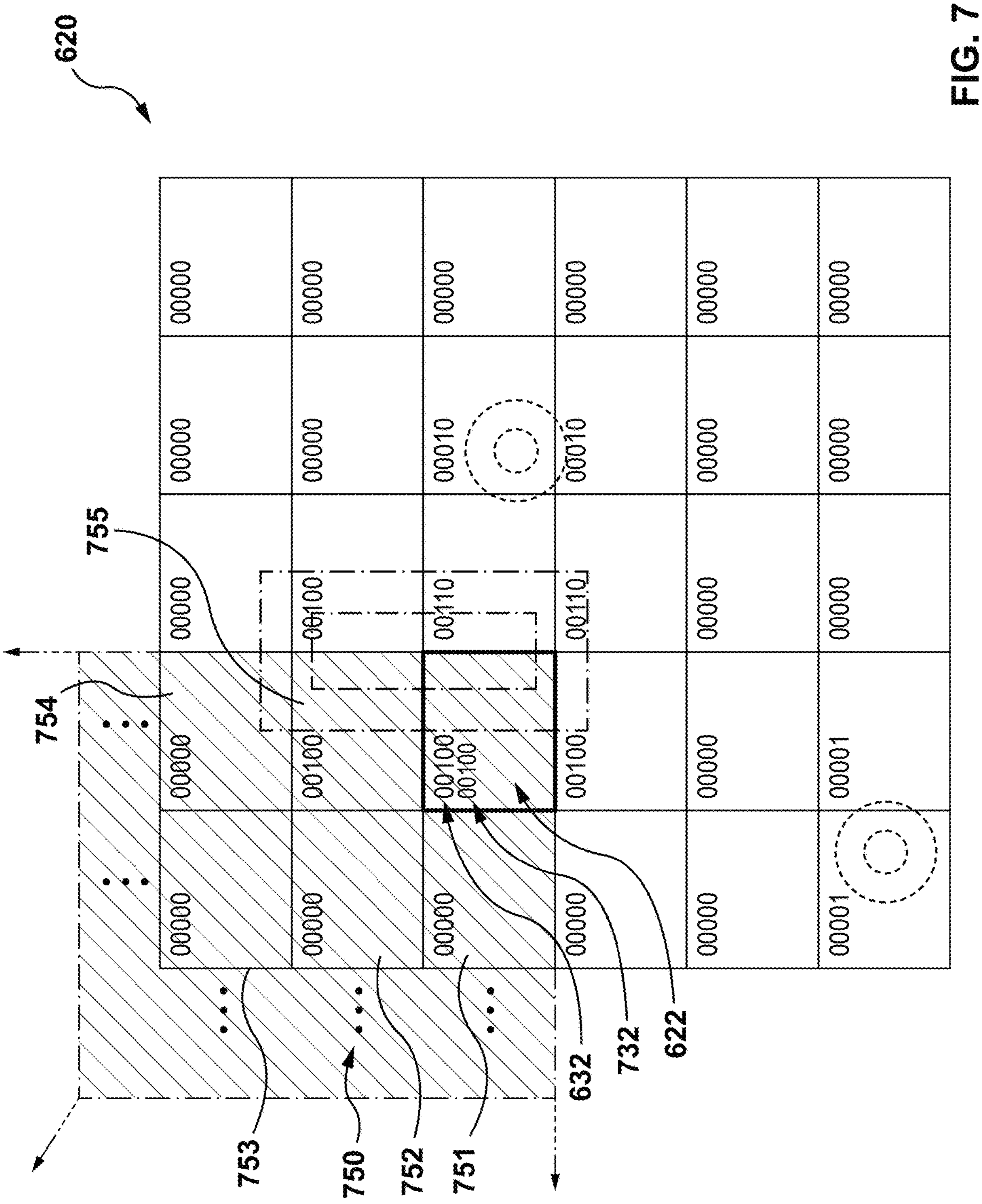
FIG. 7 depicts the grid structure of FIG. 6 with a first bitmask generated for a first cell in the grid structure, in accordance with some embodiments of the present technology.

With reference to FIG. 7, there is depicted a schematic representation of the electronic device 210 configured to generate a first bitmask 732 for the cell 632. Broadly speaking, a first bitmask is a codified representation of IDs of objects (and/or bounding elements thereof) that are present in a portion of the surroundings that is covered by a first cluster of cells from the grid structure 620 that includes the given cell for which the first bitmask is being generated.

In this example, the electronic device 210 is configured to generate the first bitmask 732 as "00100" for the cell 622. The first bitmask 732 being "00100" is indicative of that objects with IDs "0", "1", "3", and "4" (and/or the corresponding bounding elements) are not present in the portion of the surroundings covered by a first cluster of cells 750 because a first bit position for ID "0", a second bit position for ID "1", a fourth bit position for ID "3", and a fifth bit position for ID "4" are all assigned with a value of "0". However, the first bitmask 732 being "00100" is indicative of that object with IDs "2" is present in the portion of the surroundings covered by the first cluster of cells 750 because a third bit position for ID "2" is assigned with a value of "1".

In this example, the first cluster of cells 750 is an upper left section of the grid structure 620 including the cell 622. In other words, the first cluster of cells 750 includes inter alia cells 751-755, other cells from the upper left section of the grid structure 620 which are not illustrated in FIG. 7 for simplicity, and the cell 622 for which the first bitmask 732 is being generated.

In some embodiments, the electronic device 210 is configured to execute one or more operations on the preliminary bitmasks of the first cluster of cells 750 in order to generate the first bitmask 732. In one embodiment, the electronic device 210 may be configured to execute AND/OR operations on preliminary bitmasks.

Broadly, AND and OR operations are operations performed on bitcodes, which are sequences of binary digits (bits). On the one hand, The AND operation compares corresponding bits of two bitcodes and produces a new bitcode where each bit is set to "1" if both corresponding bits in the input bitcodes are "1". Otherwise, the bit is set to "0". In other words, the result is "1" only if both bits are "1"; otherwise, it is "0". For example, the AND operation is denoted by the symbol "&" or by the keyword "AND" in at least some programming languages. For example, performing an AND operation on bitcodes "11011010" and "10110100" results in the bitcode "10010000". On the other hand, the OR operation compares corresponding bits of two bitcodes and produces a new bitcode where each bit is set to "1" if at least one of the corresponding bits in the input bitcodes is "1". If both bits are "0", the result is "0". For example, the OR operation is denoted by the symbol "|" or by the keyword "OR" in some programming languages. For example, performing an OR operation on bitcodes "11011010" and "10110101" results in the bitcode "11111111". It should be noted that both AND and OR operations are commutative, meaning the order of the operands does not affect the result. Additionally, these operations can be applied to more than two bitcodes by performing the operation iteratively on pairs of bitcodes.

Figure 8:
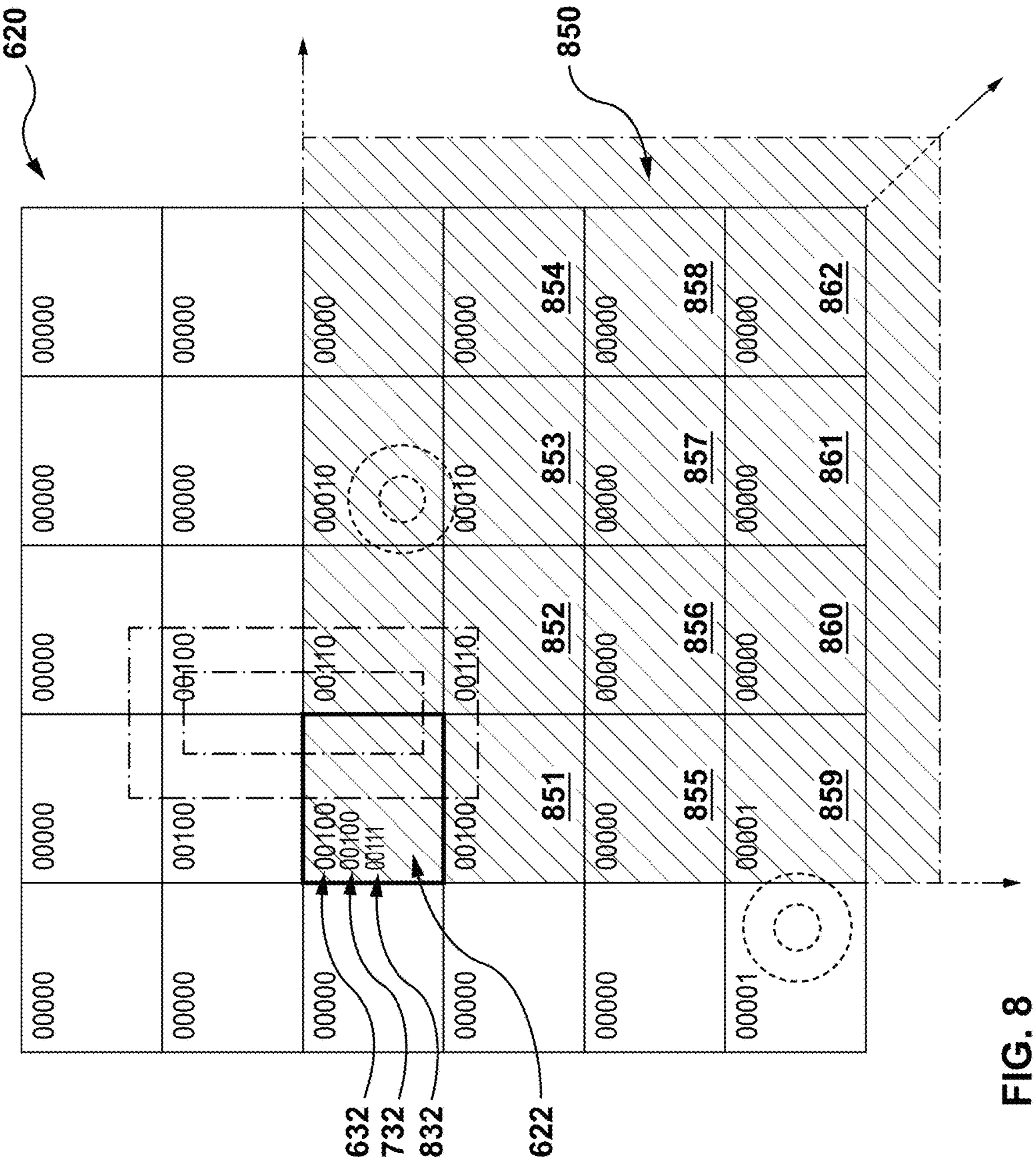
FIG. 8 depicts the grid structure of FIG. 6 with a second bitmask generated for the first cell, in accordance with some embodiments of the present technology.

With reference to FIG. 8, there is depicted a schematic representation of the electronic device 210 is configured to generate a second bitmask 832 for the cell 622, in addition to the first bitmask 732. Broadly speaking, a second bitmask is a codified representation of IDs of objects (and/or bounding elements thereof) that are present in a portion of the surroundings that is covered by a second cluster of cells from the grid structure 620, and where the second cluster is mutually exclusive from the first cluster (except for the given cell) used to generate the first bitmask of a same given cell for which the second bitmask is being generated.

In this example, the electronic device 210 is configured to generate the second bitmask 832 as "00111" for the cell 622. The second bitmask 832 being "00111" is indicative of that objects with IDs "0", and "1" (and/or the corresponding bounding elements) are not present in the portion of the surroundings covered by a second cluster of cells 850 because a first bit position for ID "0", and a second bit position for ID "1" are all assigned with a value of "0". However, the second bitmask 832 being "00111" is indicative of that objects with IDs "2", "3", and "4" are present in the portion of the surroundings covered by the second cluster of cells 850 because a third bit position for ID "2", a fourth bit for ID "3", and a fifth bit for ID "4" are assigned with a value of "1".

In this example, the first cluster of cells 850 is a lower right section of the grid structure 620 including the cell 622. In other words, the second cluster of cells 850 includes inter alia cells 851-862, other cells from the lower right section of the grid structure 620 which are not illustrated in FIG. 8 for simplicity, and the cell 622 for which the second bitmask 832 is being generated. The first cluster of cells 750 and the second cluster of cells 850 are mutually exclusive except for one cell only, as they intersect at only the cell 622.

The first cluster of cells 750 is symmetrical to the second cluster of cells 850 in the grid structure 620. In other embodiments, instead of encoding object ID information from an upper left section of the grid structure 620 relative to a given cell into a first bitmask of the given cell and encoding object ID information from the lower right section of the grid structure 620 relative to the given cell into the second bitmask of the given cell, the electronic device 210 may be configured to encode object ID information from an upper right section of the grid structure 620 relative to a given cell into a first bitmask of the given cell and encode object ID information from the lower left section of the grid structure 620 relative to the given cell into the second bitmask of the given cell, without departing from the scope of the present technology.

In some embodiments, the electronic device 210 is configured to execute one or more operations on the preliminary bitmasks of the second cluster of cells 850 in order to generate the second bitmask 832, similarly to how the electronic device 210 is configured to execute one or more operations on the preliminary bitmasks of the first cluster of cells 750 in order to generate the second bitmask 732.

Figure 9:
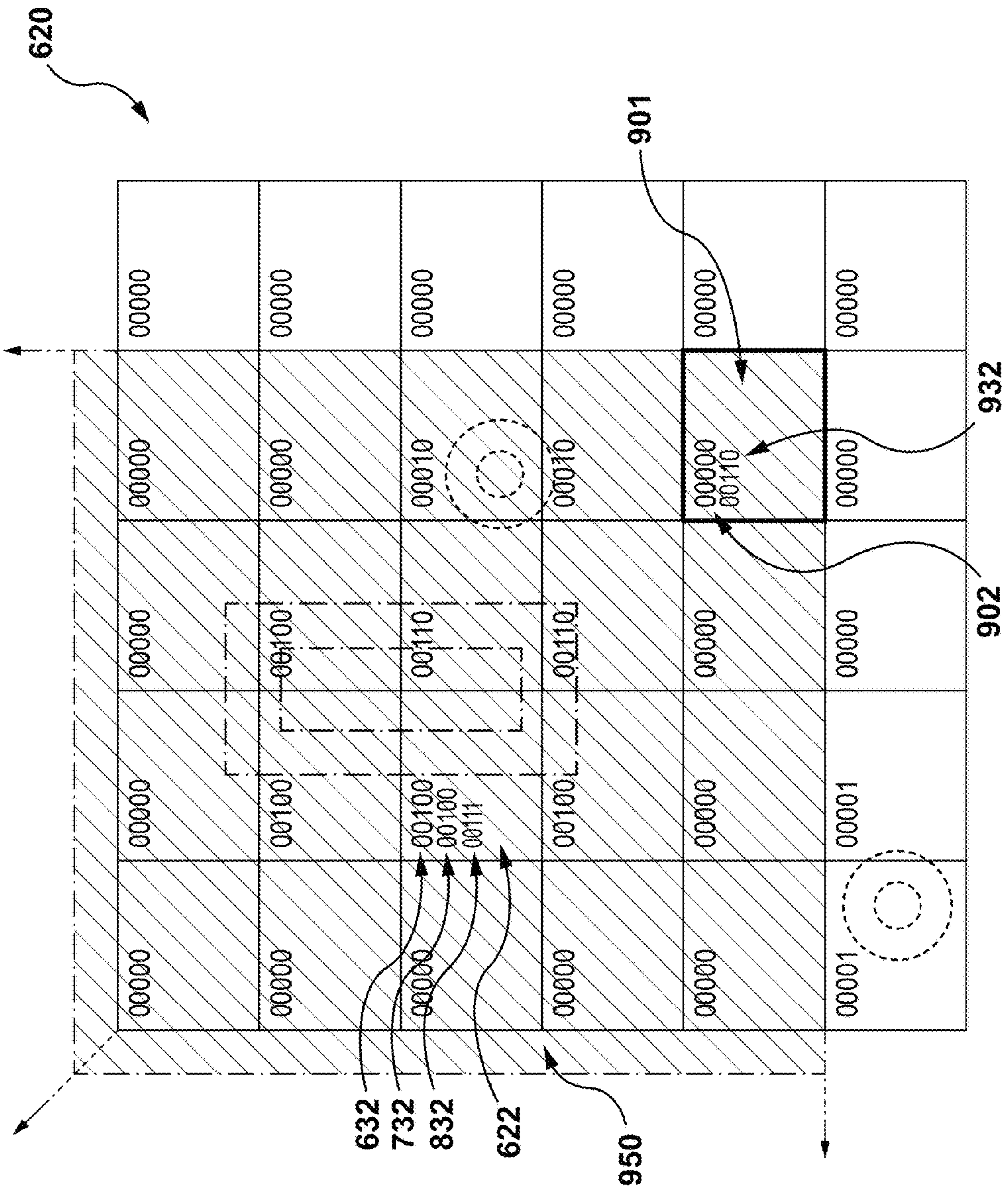
FIG. 9 depicts the grid structure of FIG. 6 with an other first bitmask generated for a second cell in the grid structure, in accordance with some embodiments of the present technology.
Figure 10:
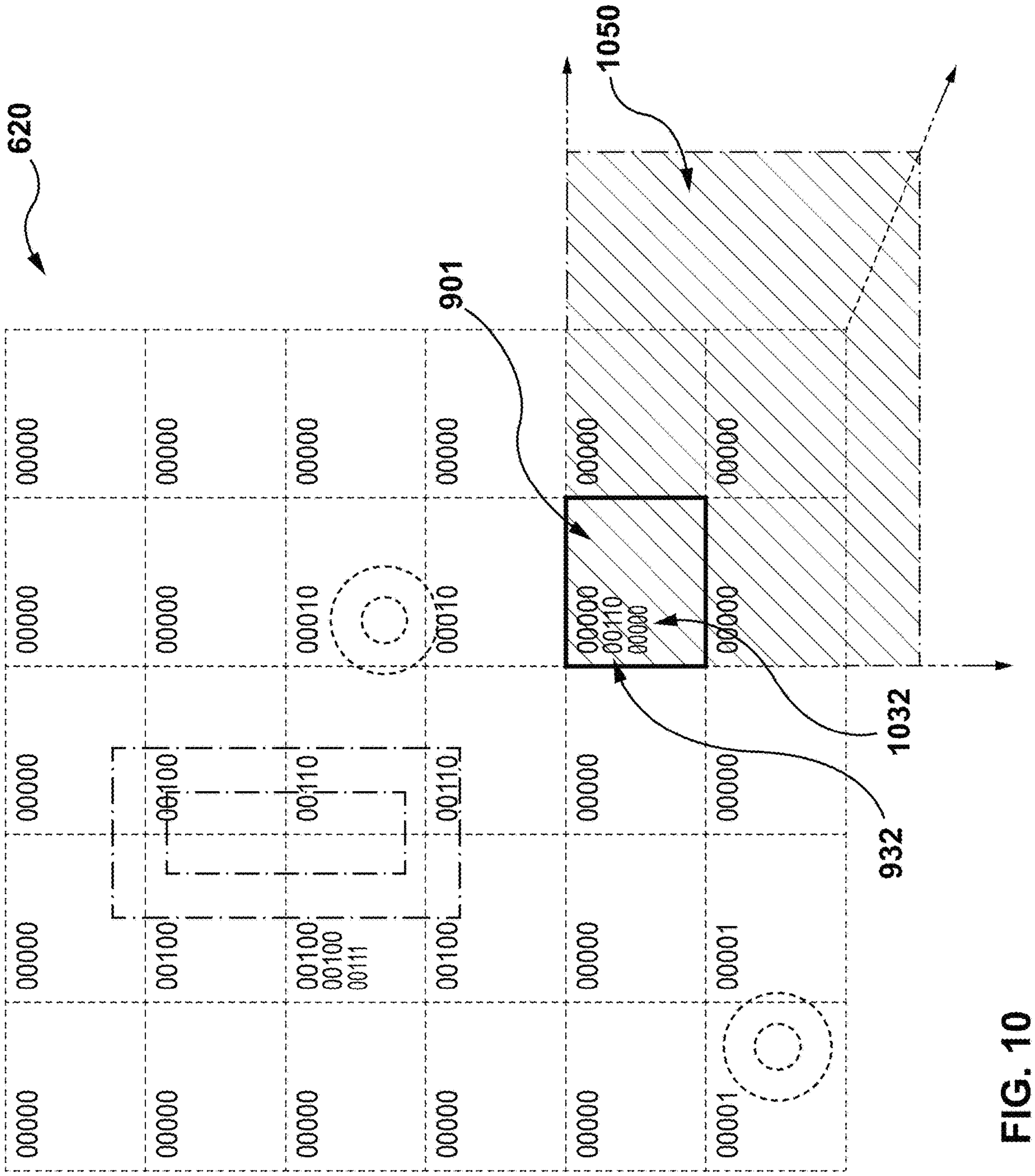
FIG. 10 depicts the grid structure of FIG. 6 with an other second bitmask generated for the second cell, in accordance with some embodiments of the present technology.

With reference to FIGS. 9 and 10, there is depicted a schematic representation of how the electronic device 210 may be configured to generate an other first bitmask 932 (FIG. 9) and an other second bitmask 1032 (FIG. 10) for an other cell 901 of the grid structure 620. Broadly, the electronic device 210 may be configured to generate the other first bitmask 932 and the other second bitmask 1032 for the other cell 901 similarly to how the electronic device 210 is configured to generate the first bitmask 732 and the second bitmask 832 for the cell 622, but using different clusters of cells defined by a different position of the other cell 901 in the grid structure 620.

As seen in FIG. 9, the electronic device 210 may be configured to generate a preliminary bitmask 902 for the other cell 901. It is contemplated that the electronic device 210 may generate the preliminary bitmask 902 prior to generating any first or second bitmasks of any cell. In other words, the electronic device 210 may be configured to generate preliminary bitmasks for all cells of the grid structure 620 prior to generating any first or second bitmask for cells of the grid structure 620.

In this example, the electronic device 210 is configured to generate the other first bitmask 932 as "00110" for the other cell 901. The other first bitmask 932 being "00110" is indicative of that objects with IDs "0", "1", and "4" (and/or the corresponding bounding elements) are not present in the portion of the surroundings covered by an other first cluster of cells 950 because a first bit position for ID "0", a second bit position for ID "1", and a fifth bit position for ID "4" are all assigned with a value of "0". However, the first bitmask 732 being "00110" is indicative of that objects with IDs "2", and "3" (and/or their respective bounding elements) are present in the portion of the surroundings covered by the other first cluster of cells 950 because a third bit position for ID "2" and a fourth bit position for ID "[2] 3" are assigned with a value of "1".

In this example, the other first cluster of cells 950 is an upper left section of the grid structure 620 relative to the other cell 901, and includes the cell 901. In some embodiments, the electronic device 210 is configured to execute one or more operations on the preliminary bitmasks of the other first cluster of cells 950 in order to generate the other first bitmask 932 as alluded to above.

As seen in FIG. 10, the electronic device 210 is configured to generate the other second bitmask 1032 as "00000" for the other cell 901. The other second bitmask 1032 being "00000" is indicative of that none of the objects (and/or the corresponding bounding elements) are present in the portion of the surroundings covered by the other second cluster of cells 1050 because all bit position of the other second bitmask are assigned with a value of "0".

In this example, the first cluster of cells 850 is a lower right section of the grid structure 620, relative to the other cell 901, and includes the cell 901. The other first cluster of cells 950 and the other second cluster of cells 1050 are mutually exclusive except for one cell only, as they intersect only at the other cell 901.

In some embodiments, the electronic device 210 is configured to execute one or more operations on the preliminary bitmasks of the other second cluster of cells 1050 in order to generate the other second bitmask 1032, as previously alluded to.

Figure 11:
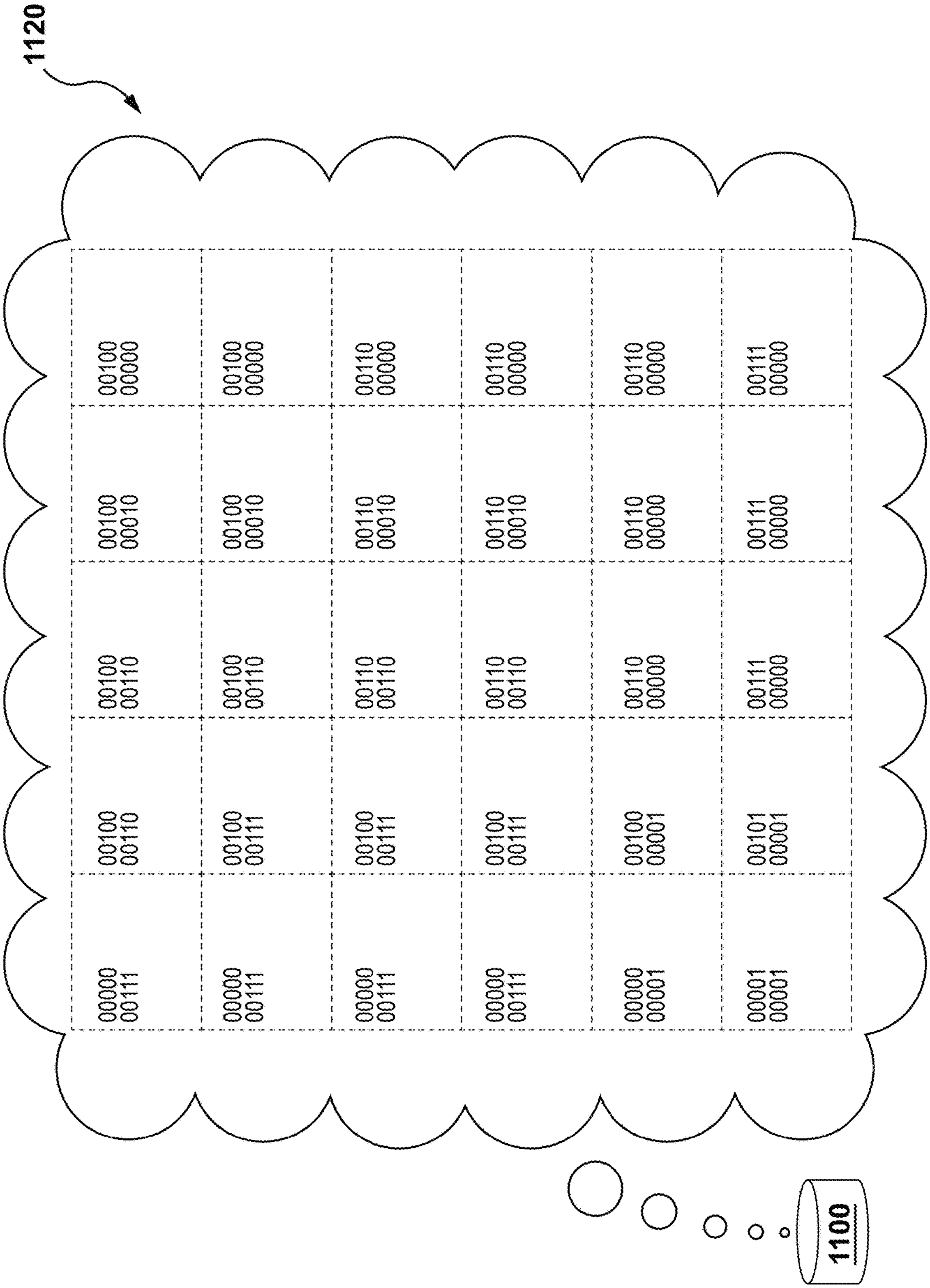
FIG. 11 depicts a cached grid structure with first and second bitmasks for respective cells of the cached grid structure, in accordance with some embodiments of the present technology.

With reference to FIG. 11, there is depicted a schematic representation of a grid structure 1100 with first and second bitmasks generated for respective cells thereof by the electronic device 210. The electronic device 210 may be configured to store data representative of the grid structure 1100 (including respective first and second bitmasks) in the cache 1100 for use by one or more other modules from the processing pipeline 400. The cache 1100 may be a component of the electronic device 210 and/or of an other computer system associated with the electronic device 210 and/or the vehicle 220.

It should be noted that the electronic device 210 may generate preliminary bitmasks for respective cells of the grid structure 620 and use them for then generating respective first and second bitmasks for respective cells of the grid structure 620, as explained above. However, the electronic device 210 may be configured to store in cache the grid structure 1120 which does not include data representative of the preliminary bitmasks, and instead includes data representative of the first and second bitmasks for respective cells. This may be advantageous in at least some implementations of the present technology.

Search Operation

Figure 12:
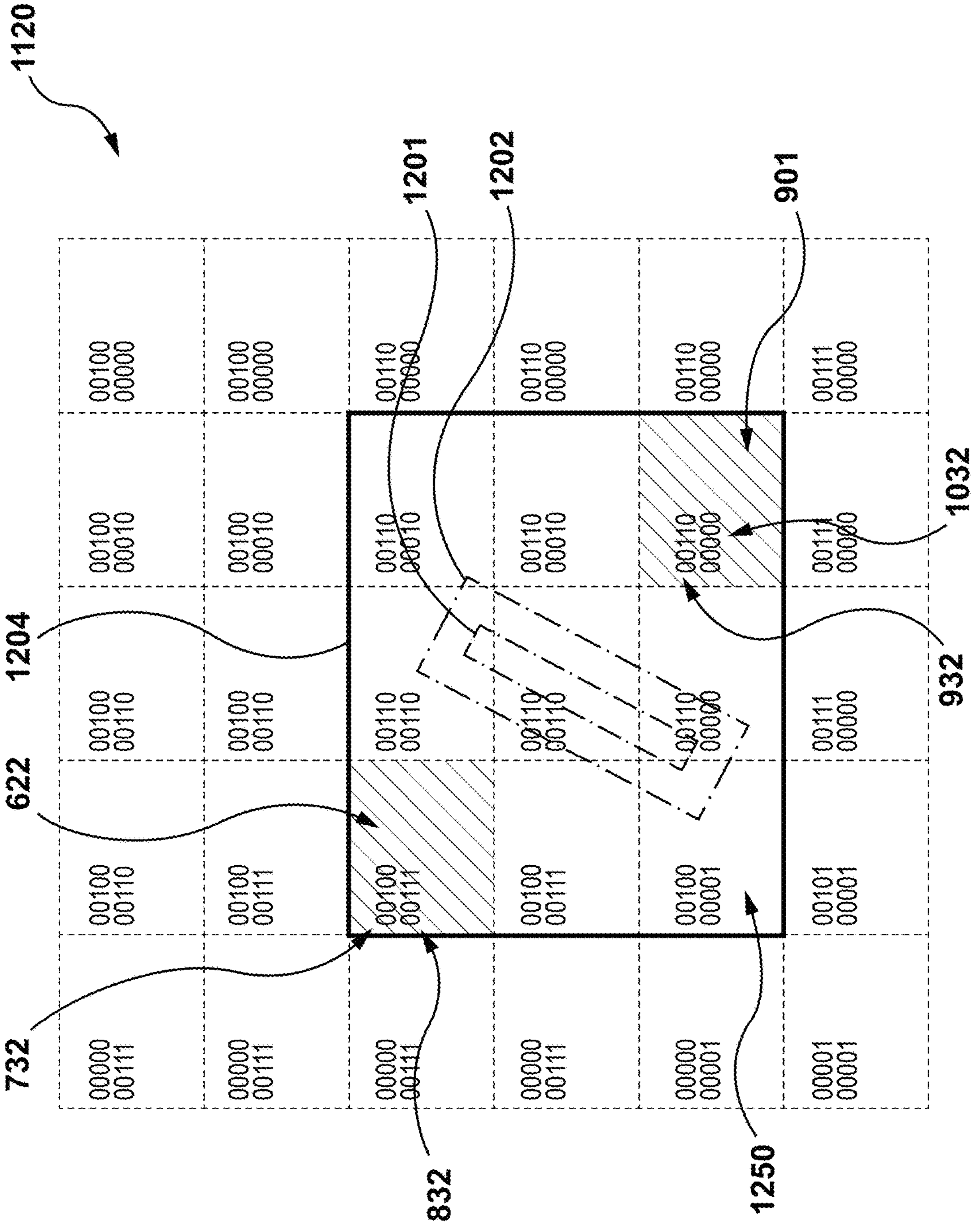
FIG. 12 depicts the cached grid structure of FIG. 11 with a target cluster of cells with the cached grid structure, in accordance with some embodiments of the present technology.

With reference to FIG. 12, there is depicted a schematic representation of how the electronic device 210 is configured to perform a search operation using the grid structure 1120 and, for example, localization data about the vehicle 220 received from the localization module 410 of the processing pipeline 400.

In this example, the localization data may be indicative of a location of an object 1201 representing the vehicle 220, a bounding box 1202 generated for the object 1201, and a vicinity 1204 around the object 1201 and/or the bounding box 1202. It is contemplated that the electronic device 210 may be configured to determine a size of the vicinity 1204 based on inter alia the location of the object 1201 and/or the bounding box 1202 of the object 1201. In other embodiments, it is contemplated that the electronic device 210 may be configured to determine a size of the vicinity 1204 based on data received via a query. It is contemplated that size of the vicinity 1204 may depend on inter alia various implementations of the present technology.

The vicinity 1204 covers a target portion of the surroundings of the vehicle 220. The vicinity 1204 includes a target cluster of cells 1250 including the bounding box 1202 and the object 1201. In this example, the target cluster of cells 1250 includes nine target cells in total, however, this may not be the case in each and every implementation of the present technology. It is contemplated that the electronic device 210 may be configured to determine a size of the target portion based on inter alia the location of the object 1201 and/or the bounding box 1202 of the object 1201. In other embodiments, it is contemplated that the electronic device 210 may be configured to determine a size of the target portion based on data received via a query. It is contemplated that size of the target portion may depend on inter alia various implementations of the present technology.

The electronic device 210 is configured to identify two opposite target cells in the target cluster of cells 1250. In this example, the electronic device 210 may identify the cell 622 and the other cell 901 as the two opposite target cells in the target cluster of cells 1250. In this example, the electronic device 210 identifies the two opposite target cells as a top left target cell in the target cluster of cells 1250 and a bottom right target cell in the target cluster of cells 1250. It is contemplated that identification of opposite target cells may be performed using coordinates of respective target cells in the grid structure 1120.

However, it is contemplated that in an other embodiment, the electronic device 210 may identify the two opposite target cells as a top right target cell in the target cluster of cells 1250 and a bottom left target cell in the target cluster of cells 1250. In this other embodiment, the electronic device 210 may be configured to encode object ID information from an upper right section of the grid structure 620 relative to a given cell into a first bitmask of the given cell and object ID information from the lower left section of the grid structure 620 relative to the given cell into the second bitmask of the given cell.

The electronic device 210 is configured to perform one or more operations of the first bitmask 732, the second bitmask 832, the other first bitmask 932, and the other second bitmask 1032 in order to identify which objects (and/or respective bounding elements) are located within the vicinity 1204 of the vehicle 220.

In one embodiment, the electronic device 210 may be configured to execute one or more operations on the second bitmask 832 and the other first bitmask 932. For example, the electronic device 210 performing an AND operation on the second bitmask 832 "00111" and the other first bitmask 932 "00110" results in a target bitmask "00110". The target bitmask "00110" is indicative of objects (and/or respective bounding elements) with the IDs "2" and "3" being present in the vicinity 1204 with the two opposite target cells 622 and 901. The search engine 450 may provide a result to a query in a form of the target bitmask 932. In this example, it should be noted that the target bitmask 932 is indicative of object IDs that are present (and/or respective bounding elements are present) in the vicinity of the vehicle 220. The electronic device 210 may use this information downstream in the processing pipeline 400 for planning and/or control purposes of the vehicle 220.

Figure 13:
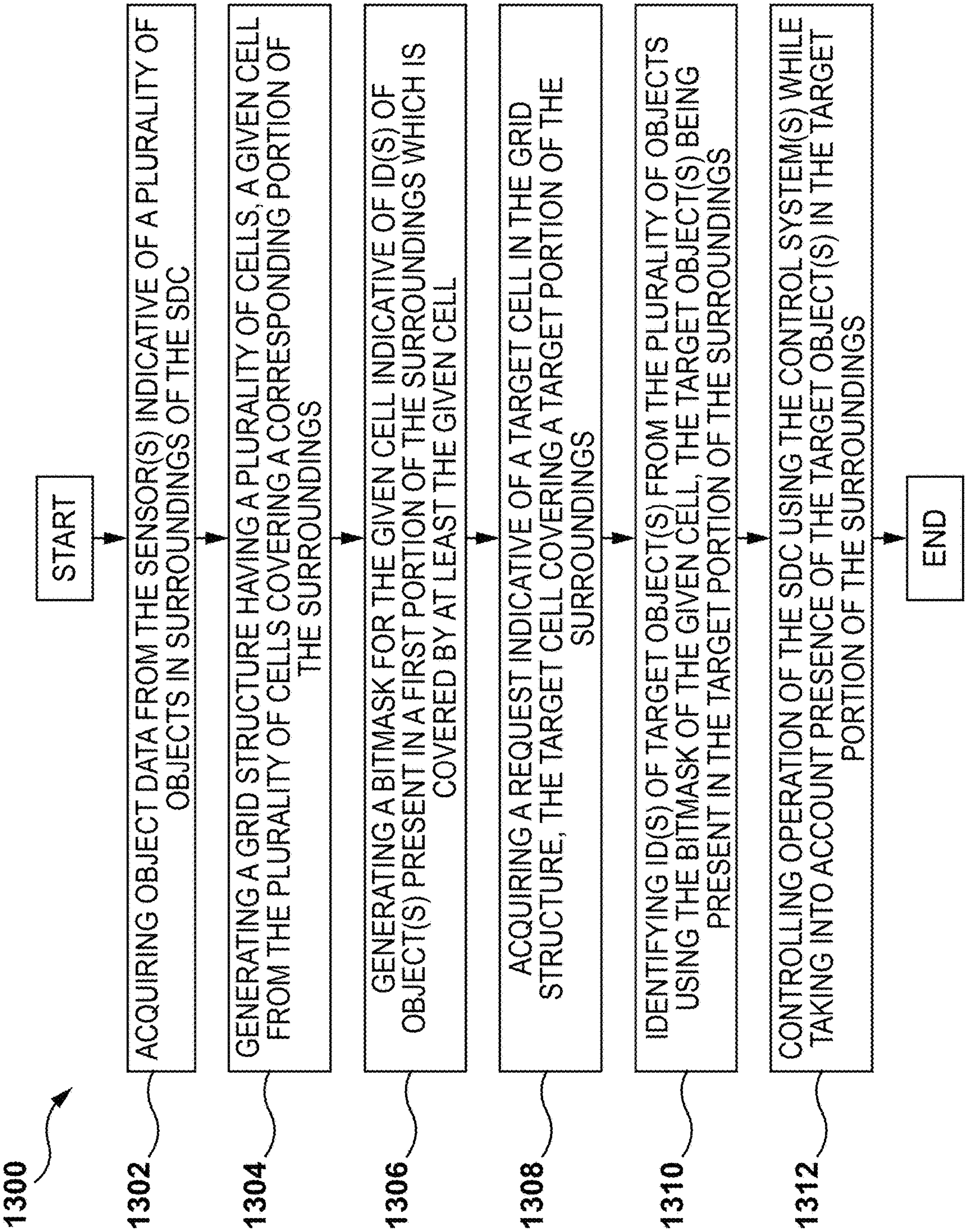
FIG. 13 is a schematic flowchart of a method executable in accordance with certain non-limiting embodiments of the present technology.

With reference to FIG. 13, there is depicted a schematic-block diagram of a method 1300 executable by the electronic device 210. Various steps of the method 1300 will now be described in greater details.

With reference to FIG. 13, there is depicted a scheme-block diagram of a method 1300 executable by the electronic device 210. Various steps of the method 1300 will now be described in greater details.

Step 1302: Acquiring Object Data From the Sensor(s) Indicative of a Plurality of Objects in Surroundings of the SDC The method 1300 begins at step 1302, with the electronic device 210 configured to acquire object data from sensors indicative of a plurality of objects in the surroundings of the vehicle 220. A given object from the plurality of objects being assigned with a respective ID.

For example, the electronic device 210 may receive object data 602 indicative of the objects 604, 606, and 608. It is contemplated that object data 602 for the objects 604, 606, and 608 may include their respective object IDs. It is contemplated that object data 602 for the objects 604, 606, and 608 may include data indicative of their respective bounding elements, namely the bounding box 614, the bounding circle 616, and the bounding circle 618. It is contemplated that the object data 602 may be indicative of locations and/or orientations of the objects 604, 606, and 608 in the surroundings of the vehicle 220. In one embodiment, the locations and/or orientations of the objects 604, 606, and 608 and/or of the respective bounding elements may be represented in a system of coordinates of one or more sensors of the vehicle 220.

In some embodiments, the plurality of objects from the object data may comprise an object of a first type, and an other object of a second type. For example, a first object may be of a pedestrian class, and a second object may be of a vehicle class.

Step 1304: Generating a Grid Structure Having a Plurality of Cells, a Given Cell from the Plurality of Cells Covering a Corresponding Portion of the Surroundings The method 1300 continues to step 1304 with the electronic device 210 configured to generate a grid structure having a plurality of cells and where a given cell covers a corresponding portion of the surroundings of the vehicle 220. For example, the electronic device 210 may be configured to generate the grid structure 620 with a plurality of cells covering the surroundings of the vehicle 220.

Step 1306: Generating a Bitmask for the Given Cell Indicative of ID(s) of Object(s) Present in a First Portion of the Surroundings which is Covered by at Least the Given Cell The method 1300 continues to step 1306 with the electronic device 210 configured to generating a bitmask of a given cell of the grid structure. The bitmask is indicative of ID(s) of object(s) present in a first portion of the surroundings which is covered by at least the given cell.

In one embodiment, the bitmask is a sequence of N bits, an $i_{th}$ bit position in the sequence of N bits is representative of presence (or otherwise absence) of a corresponding object from the plurality of objects with an $i_{th}$ ID. In other embodiments, the bitmask is a sequence of N bits, an $i_{th}$ bit position in the sequence of N bits is representative of presence (or otherwise absence) of a corresponding object from the plurality of objects with an $i_{th}+1$ ID.

In some embodiments, the electronic device 210 may be configured to generate a bounding elements for the plurality of objects, where a given bounding element for a given object occupying a larger portion of the surroundings of the vehicle 220 than the given object itself. In these embodiments, the electronic device 210 may be configured to generate the bitmask indicative of the ID(s) of object(s) with corresponding bounding elements present in the first portion of the surroundings.

In other embodiment, the bitmask may be a preliminary bitmask. In these embodiments, the electronic device 210 may be configured to generate a preliminary bitmask for the given cell, and where the preliminary bitmask is indicative of the ID(s) of object(s) present in the portion of the surroundings covered by the given cell.

In further embodiments, the bitmask may be generated based on one or more preliminary bitmasks. For example, the electronic device 210 may be configured to generate preliminary bitmasks for a cluster of cells including the given cell, and perform one or more operations on the preliminary bitmasks for the cluster of cells in order to generate the bitmask for the given cell.

In yet additional embodiments, the bitmask may be a first bitmask for the given cell. For example, the electronic device 210 may be configured to generate the first bitmask 932 for the cell 901 and indicative of ID(s) of object(s) present in a first portion of the surroundings which is covered by the cluster of cells 950 from the plurality of cells.

In yet a further embodiment, the bitmask may be a second bitmask for the given cell. For example, the electronic device 210 may be configured to generate the second bitmask 832 for the cell 622 and indicative of ID(s) of object(s) present in a second portion of the surroundings which is covered by the cluster of cells 850 from the plurality of cells.

Step 1308: Acquiring a Request Indicative of a Target Cell in the Grid Structure, the Target Cell Covering a Target Portion of the Surroundings The method 1300 continues to step 1308 with the electronic device configured to acquire a request indicative of a target cell in the grid structure, covering a target portion of the surroundings. The request may take form of a query from the planning module 410, for example.

It should be noted that the grid structure with one or more bitmasks per respective cell may be stored in a cache of the electronic device 210 during a first moment in time. In other words, it can be said that the electronic device 210 may generate the grid structure with bitmasks at a first moment in time during a control loop, and during a second moment in time of the control loop, the planning module 410 may submit one or more queries for target objects in target portions of the surroundings of the vehicle 220.

In some embodiments, the target cell may be a target cluster of cells from the plurality of cells in the grid structure. For example, the target cluster of cells 1250 covering the target portion of the surroundings includes the cell 622 and the cell 901.

Step 1310: Identifying ID(s) of Target Object(s) from the Plurality of Objects Using the Bitmask of the Given Cell, the Target Object(s) being Present in the Target Portion of the Surroundings The method 1300 continues to step 1310 with the electronic device 210 configured to identify ID(s) of target object(s) from the plurality of objects using the bitmask of the given cell. The target object(s) being present in the target portion of the surroundings.

In some embodiments, the electronic device 210 may use the first bitmask of the given cell and the second bitmask of the other given cell. It is also contemplated that the electronic device 210 may generate a target bitmask by performing an operation on the first bitmask and the second bitmask, and where the target bitmask being indicative of the ID(s) of the target object(s).

For example, the electronic device 210 may be configured to use the first bitmask 932 of the cell 901 and the second bitmask 832 of the cell 622 to perform an operation and generate a target bitmask indicative of the ID(s) of target object(s) present in the target portion. It should be noted that the cluster of cells 850 used to generate the second bitmask 832, and the cluster of cells 950 used to generate the first bitmask 932 are mutually exclusive, except for the target cluster of cells 1250. As such, performing the operation on the first bitmask 932 of the cell 901 and the second bitmask 832 of the cell 622 may allow generating the target bitmask, and thereby extracting object ID information of target objects in the target cluster of cells 1250.

In some embodiments, a first cluster of cells associated with a first bitmask used in the operation is symmetrical to a second cluster of cells associated with a second bitmask used in the operation. It is contemplated that cells associated with the first and second bitmask used for generating the target bitmask may be diagonally opposite cells in the target cluster of cells.

Step: 1312 Controlling Operation of the SDC Using the Control System(s) while Taking into Account Presence of the Target Object(s) in the Target Portion of the Surroundings The method 1300 continues to step 1312 with the electronic device 210 controlling operation of the vehicle 220 using control system(s) of the vehicle 220 while taking into account presence of the target object(s) in the target portion of the surroundings.

As mentioned above, the electronic device 210 may be configured to perform one or more planning tasks based on occupancy analysis of target portion(s) of the surroundings of the vehicle 220. It is contemplated that the planning module 410 may be configured to generate a trajectory for the vehicle 220 based on the occupancy analysis of target portion(s) of the surroundings and/or determine actions to be taken by the vehicle 220 based on the occupancy analysis of target portion(s) of the surroundings.

In some embodiments, the electronic device 210 may use planning data, generated based on the occupancy analysis of the target portion(s), in order to transmit signals to the control system(s) of the vehicle 220 for actuating one or more actuators of the vehicle 220 and thereby controlling operation of the vehicle 220 in accordance with the planning data.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of controlling operation of a Self-Driving Car (SDC), the method being executable by processor(s) communicatively coupled to sensor(s) and control system(s) of the SDC, the method comprising:
- at a first moment in time:
  - acquiring object data from the sensor(s) indicative of a plurality of objects in surroundings of the SDC, a given object from the plurality of objects being assigned with a respective identifier (ID);
  - generating a grid structure having a plurality of cells, a given cell from the plurality of cells covering a corresponding portion of the surroundings;
  - generating a bitmask for the given cell indicative of ID(s) of object(s) present in a first portion of the surroundings which is covered by at least the given cell;
- at a second moment in time:
  - acquiring a request indicative of a target cell in the grid structure, the target cell covering a target portion of the surroundings;
  - identifying ID(s) of target object(s) from the plurality of objects using the bitmask of the given cell, the target object(s) being present in the target portion of the surroundings; and
  - controlling operation of the SDC using the control system(s) while taking into account presence of the target object(s) in the target portion of the surroundings.

2. The method of claim 1, wherein the method further comprises:
- at the first moment in time:
  - generating a preliminary bitmask for the given cell, the preliminary bitmask being indicative of the ID(s) of object(s) present in the corresponding portion;
- and wherein the generating the bitmask for the given cell includes:
  - generating the bitmask by performing an operation on preliminary bitmasks of a cluster of cells.

3. The method of claim 1, wherein the target cell is a target cluster of cells from the plurality of cells, the target cluster of cells covering the target portion of the surroundings, the target cluster of cells including the given cell and an other given cell, the method further comprising:
- at the first moment in time:
  - generating an other bitmask for the other given cell indicative of ID(s) of object(s) present in an other portion of the surroundings covered by an other cluster of cells from the plurality of cells, the other cluster of cells including the other given cell;
- wherein the identifying ID(s) of target object(s) present in the target portion includes:
  - generating a target bitmask based on a combination of the bitmask of the given cell and the other bitmask of the other given cell, the target bitmask being indicative of the ID(s) of target object(s) present in the target portion.

4. The method of claim 3, wherein the first cluster of cells is symmetrical to the second cluster of cells in the grid structure.

5. The method of claim 3, wherein the given cell and the other given cell are diagonally opposite cells in the target cluster of cells.

6. The method of claim 1, wherein the method further comprises:
- generating bounding elements for the plurality of objects, a given bounding element for the given object occupying a larger portion of the surroundings of the SDC than the given object;

and wherein the bitmask is indicative of the ID(s) of object(s) with corresponding bounding elements present in the corresponding portion.

7. The method of claim 1, wherein the plurality of objects comprises an object of a first type, and an other object of a second type, the first type being different from the second type.

8. The method of claim 1, wherein the bitmask is a sequence of N bits, an $i_{th}$ bit in the sequence of N bits being representative of presence of the given object from the plurality of objects with an $i_{th}$ ID.

9. A method of controlling operation of a Self-Driving Car (SDC), the method being executable by processor(s) communicatively coupled to sensor(s) and control system(s) of the SDC, the method comprising:
- at a first moment in time:
  - acquiring object data from the sensor(s) indicative of a plurality of objects in surroundings of the SDC, a given object from the plurality of objects being assigned with a respective identifier (ID);
  - generating a grid structure having a plurality of cells, a given cell from the plurality of cells covering a corresponding portion of the surroundings;
  - generating a first bitmask for the given cell indicative of ID(s) of object(s) present in a first portion of the surroundings which is covered by a first cluster of cells from the plurality of cells, the first cluster of cells including the given cell and an other given cell;

generating a second bitmask for the other given cell indicative of ID(s) of object(s) present in a second portion of the surroundings which is covered by a second cluster of cells from the plurality of cells, the first cluster of cells including the given cell and an other given cell, the first cluster of cells at least partially overlapping with the second cluster of cells in addition to the given cell and the other given cell;

at a second moment in time:

acquiring a request indicative of a target cluster of cells in the grid structure, the target cluster of cells covering a target portion of the surroundings, the target cluster of cells including the given cell and an other given cell;

identifying ID(s) of target object(s) from the plurality of objects using the first bitmask of the given cell and the second bitmask of the other given cell, the target object(s) being present in the target portion of the surroundings; and controlling operation of the SDC using the control system(s) while taking into account presence of the target object(s) in the target portion of the surroundings.

10. The method of claim 9, wherein the identifying the ID(s) of the target object(s) includes:

generating a target bitmask by performing an operation on the first bitmask and the second bitmask, the target bitmask being indicative of the ID(s) of the target object(s).

11. An electronic device for controlling operation of a Self-Driving Car (SDC), the SDC comprising sensor(s) and control system(s), the electronic device configured to:

at a first moment in time:

acquire object data from the sensor(s) indicative of a plurality of objects in surroundings of the SDC, a given object from the plurality of objects being assigned with a respective identifier (ID);

generate a grid structure having a plurality of cells, a given cell from the plurality of cells covering a corresponding portion of the surroundings;

generate a bitmask for the given cell indicative of ID(s) of object(s) present in a first portion of the surroundings which is covered by at least the given cell;

at a second moment in time:

acquire a request indicative of a target cell in the grid structure, the target cell covering a target portion of the surroundings;

identify ID(s) of target object(s) from the plurality of objects using the bitmask of the given cell, the target object(s) being present in the target portion of the surroundings; and control operation of the SDC using the control system(s) while taking into account presence of the target object(s) in the target portion of the surroundings.

12. The electronic device of claim 11, wherein the electronic device is further configured to:

at the first moment in time:

generate a preliminary bitmask for the given cell, the preliminary bitmask being indicative of the ID(s) of object(s) present in the corresponding portion;

and wherein to generate the bitmask for the given cell includes the electronic device configured to:

generate the bitmask by performing an operation on preliminary bitmasks of a cluster of cells.

13. The electronic device of claim 11, wherein the target cell is a target cluster of cells from the plurality of cells, the target cluster of cells covering the target portion of the surroundings, the target cluster of cells including the given cell and an other given cell, the electronic device further configured to:

at the first moment in time:

generate an other bitmask for the other given cell indicative of ID(s) of object(s) present in an other portion of the surroundings covered by an other cluster of cells from the plurality of cells, the other cluster of cells including the other given cell;

wherein to identify ID(s) of target object(s) present in the target portion includes the electronic device configured to:

generate a target bitmask based on a combination of the bitmask of the given cell and the other bitmask of the other given cell, the target bitmask being indicative of the ID(s) of target object(s) present in the target portion.

14. The electronic device of claim 13, wherein the first cluster of cells is symmetrical to the second cluster of cells in the grid structure.

15. The electronic device of claim 13, wherein the given cell and the other given cell are diagonally opposite cells in the target cluster of cells.

16. The electronic device of claim 11, wherein the electronic device is further configured to:

generate bounding elements for the plurality of objects, a given bounding element for the given object occupying a larger portion of the surroundings of the SDC than the given object;

and wherein the bitmask is indicative of the ID(s) of object(s) with corresponding bounding elements present in the corresponding portion.

17. The electronic device of claim 11, wherein the plurality of objects comprises an object of a first type, and an other object of a second type, the first type being different from the second type.

18. The electronic device of claim 11, wherein the bitmask is a sequence of N bits, an $i_{th}$ bit in the sequence of N bits being representative of presence of the given object from the plurality of objects with an $i_{th}$ ID.

19. An electronic device for controlling operation of a Self-Driving Car (SDC), the SDC comprising sensor(s) and control system(s) of the SDC, the electronic device configured to:

at a first moment in time:

acquire object data from the sensor(s) indicative of a plurality of objects in surroundings of the SDC, a given object from the plurality of objects being assigned with a respective identifier (ID);

generate a grid structure having a plurality of cells, a given cell from the plurality of cells covering a corresponding portion of the surroundings;

generate a first bitmask for the given cell indicative of ID(s) of object(s) present in a first portion of the surroundings which is covered by a first cluster of cells from the plurality of cells, the first cluster of cells including the given cell and an other given cell;

generate a second bitmask for the other given cell indicative of ID(s) of object(s) present in a second portion of the surroundings which is covered by a second cluster of cells from the plurality of cells, the first cluster of cells including the given cell and an other given cell, the first cluster of cells at least partially overlapping with the second cluster of cells in addition to the given cell and the other given cell;

at a second moment in time:

acquire a request indicative of a target cluster of cells in the grid structure, the target cluster of cells covering a target portion of the surroundings, the target cluster of cells including the given cell and an other given cell;

identify ID(s) of target object(s) from the plurality of objects using the first bitmask of the given cell and the second bitmask of the other given cell, the target object(s) being present in the target portion of the surroundings; and control operation of the SDC using the control system(s) while taking into account presence of the target object(s) in the target portion of the surroundings.

20. The electronic device of claim 19, wherein to identify the ID(s) of the target object(s) includes the electronic device configured to:

generate a target bitmask by performing an operation on the first bitmask and the second bitmask, the target bitmask being indicative of the ID(s) of the target object(s).

* * * * *